United States Patent [19]
Wilson et al.

[11] Patent Number: 5,655,618
[45] Date of Patent: *Aug. 12, 1997

[54] TORQUE MODULATED TRANSFER CASE

[75] Inventors: Robert J. Wilson, Warners; David Sperduti, Auburn; Randy W. Adler, Seneca Falls; Keith L. Snyder, North Syracuse, all of N.Y.

[73] Assignee: New Venture Gear, Inc., Troy, Mich.

[*] Notice: The term of this patent shall not extend beyond the expiration date of Pat. No. 5,323,871.

[21] Appl. No.: 410,910

[22] Filed: Mar. 27, 1995

Related U.S. Application Data

[63] Continuation of Ser. No. 230,122, Apr. 19, 1994, Pat. No. 5,400,866, which is a continuation-in-part of Ser. No. 28,952, Mar. 10, 1993, Pat. No. 5,323,871.

[51] Int. Cl.$^6$ .................................................. B60K 17/34
[52] U.S. Cl. .................... 180/197; 180/247; 180/249
[58] Field of Search ........................... 180/233, 247, 180/248, 249, 250, 197; 364/424.02, 424.03, 426.03, 424.098, 426.015, 426.027, 426.035

[56] References Cited

U.S. PATENT DOCUMENTS

| | | | |
|---|---|---|---|
| 4,417,641 | 11/1983 | Kageyama | 180/247 |
| 4,484,653 | 11/1984 | Horikoshi et al. | 180/233 |
| 4,711,317 | 12/1987 | Sakakiyama | 180/197 |
| 4,757,870 | 7/1988 | Torii et al. | 180/233 |
| 4,773,500 | 9/1988 | Naito et al. | 180/233 |
| 4,776,424 | 10/1988 | Naito | 180/233 |
| 4,846,298 | 7/1989 | Naito | 180/233 |
| 4,887,689 | 12/1989 | Naito | 180/233 |
| 4,895,236 | 1/1990 | Sakakibara et al. | 192/84 |
| 4,989,686 | 2/1991 | Miller et al. | 180/197 |
| 5,033,575 | 7/1991 | Takeshita et al. | 180/249 |
| 5,046,576 | 9/1991 | Miyawaki | 180/233 |
| 5,046,998 | 9/1991 | Frost | 475/221 |
| 5,078,660 | 1/1992 | Williams et al. | 475/84 |
| 5,152,362 | 10/1992 | Naito | 180/248 |
| 5,159,847 | 11/1992 | Williams et al. | 74/337.5 |
| 5,199,325 | 4/1993 | Reuter et al. | 74/861 |
| 5,226,860 | 7/1993 | Baxter, Jr. et al. | 180/248 X |

*Primary Examiner*—Kevin Hurley
*Assistant Examiner*—Victor E. Johnson
*Attorney, Agent, or Firm*—Harness, Dickey & Pierce, P.L.C.

[57] ABSTRACT

The present invention is directed to an improved "on-demand" power transfer system of the type having a transfer case incorporated into the driveline of a four-wheel drive vehicle. The transfer case is arranged to normally deliver drive torque to the driven wheels so as to establish a two-wheel drive mode of operation. In addition, the transfer mechanism is equipped with a clutch assembly for selectively delivering drive torque to the non-driven wheels for establishing an on-demand four-wheel drive mode of operation. The transfer mechanism is also equipped with a rotary actuator and a drive mechanism for actuating the clutch assembly. The power transfer system further includes sensors for detecting various dynamic and operational characteristics of the vehicle and generating sensor input signals indicative thereof. A controller is provided for processing the input signals and controlling actuation of the rotary actuator in response thereto. In one preferred construction, a shift mechanism is used in conjunction with the drive mechanism for selectively de-coupling the output shafts of the transfer case from its input shaft so as to establish a non-driven Neutral mode.

21 Claims, 14 Drawing Sheets

TORQUE MODULATED TRANSFER CASE

CROSS-REFERENCE

This is a continuation of U.S. Ser. No. 08/230,122, filed Apr. 19, 1994, now U.S. Pat. No. 5,400,866 which is a continuation-in-part of U.S. Ser. No. 08/028,952, filed Mar. 10, 1993, now U.S. Pat. No. 5,323,871.

BACKGROUND OF THE INVENTION

The present invention relates to a power transfer system for controlling the distribution of drive torque between the front and rear wheels of a four-wheel drive vehicle as a function of various system and operator-initiated inputs.

In view of increased consumer popularity in four-wheel drive vehicles, a plethora of power transfer systems are currently being utilized in vehicular driveline applications for selectively directing power (i.e., drive torque) to the non-driven wheels of the vehicle. In many power transfer systems, a part-time transfer case is incorporated into the driveline and is normally operable in a two-wheel drive mode for delivering drive torque to the driven wheels. In addition, such part-time transfer cases also include a mechanical "mode" shift mechanism which can be selectively actuated by the vehicle operator for rigidly coupling the non-driven wheels to the driven wheels for establishing a part-time four-wheel drive mode. As will be appreciated, a motor vehicle equipped with a part-time transfer case offers the vehicle operator the option of selectively shifting between the two-wheel drive mode during normal road conditions and the part-time four-wheel drive mode for operation under adverse road conditions.

Alternatively, it is known to use "on-demand" power transfer systems for automatically directing power to the non-driven wheels, without any input or action on the part of the vehicle operator, when traction is lost at the driven wheels. Modernly, it is known to incorporate the "on-demand" feature into a transfer case by replacing the mechanically-actuated "mode" shift mechanism with a clutch assembly that is interactively associated with an electronic control system and a sensor arrangement. During normal road conditions, the clutch assembly is maintained in a non-actuated condition such that drive torque is only delivered to the driven wheels. However, when the sensors detect a low traction condition at the driven wheels, the clutch assembly is automatically actuated to deliver drive torque "on-demand" to the non-driven wheels. Moreover, the amount of drive torque transferred through the clutch assembly to the non-driven wheels can be varied as a function of specific vehicle dynamics, as detected by the sensor arrangement. One example of such an "on-demand" power transfer system is disclosed in U.S. Pat. No. 4,773,500 to Naito, et al wherein a hydraulically-actuated clutch assembly is operable for automatically controlling the amount of drive torque transferred to the non-driven wheels as a function the wheel speed difference (i.e., the wheel slip) between the front and rear wheels. While numerous variations of such hydraulically-actuated "on-demand" systems are known, they are rather expensive and complex in that they each require a dedicated source of pressurized hydraulic fluid, electronically-controlled flow control valving and the associated hardware.

SUMMARY OF THE INVENTION

Accordingly, the present invention is directed to an improved power transfer system of the type having a transfer mechanism incorporated into the driveline of a four-wheel drive vehicle. The transfer mechanism is arranged to deliver drive torque to the driven wheels so as to establish a two-wheel drive mode of operation. In addition, the transfer mechanism is equipped with a clutch assembly for selectively delivering drive torque to the non-driven wheels for establishing a four-wheel drive mode of operation.

As a related object, the transfer mechanism is further equipped with rotary actuator means for actuating the clutch assembly. The rotary actuator means is preferably mounted directly to the transfer mechanism to substantially minimize the packaging requirements associated with the power transfer system while concomitantly enhancing in-service reliability and allowing pre-assembly of the transfer mechanism prior to final installation into the vehicle driveline.

In a first preferred form, the power transfer system further includes sensor means for detecting various dynamic and operational characteristics of the vehicle and generating sensor input signals indicative thereof, and controller means for controlling actuation of the rotary actuator means in response to the sensor input signals. Under most normal road and tractive conditions, the clutch assembly is maintained in a non-actuated condition such that drive torque is only transmitted to the driven wheels. However, upon the occurrence of traction loss at the driven wheels, the clutch assembly is automatically actuated for transferring drive torque to the non-driven wheels, thereby establishing "on-demand" four-wheel drive operation. In addition, the actuated condition of the clutch assembly is controllably modulated as a function of the sensor input signals for automatically varying the amount of drive torque directed to the non-driven wheels. Thus, the present invention is directed to an "on-demand" power transfer system capable of providing instantaneous traction improvement and enhanced steering control upon occurrence of unanticipated traction loss at the driven wheels.

The power transfer system may further include means for establishing a two-wheel drive mode and a part-time four-wheel drive mode in addition to an on-demand drive mode. To this end, mode select means are provided to permit a vehicle operator to select a desired one of the three available drive modes and generate a mode signal indicative thereof. The mode signal is delivered to the controller means for controlling actuation of the rotary actuator means. When the two-wheel drive mode is selected, all drive torque is delivered to the driven wheels and the clutch assembly is maintained in the non-actuated condition. When the part-time four-wheel drive mode is selected, the clutch assembly is fully actuated into a "lock-up" condition for distributing the drive torque between the driven and non-driven wheels as dictated by the tractive forces generated at each respective set of wheels. When the "on-demand" mode is selected, the actuated condition of the clutch assembly is controllably modulated as a function of the sensor input signals for automatically varying the amount of drive torque directed to the non-driven wheels. Thus, the power transfer system offers the vehicle operator the option of selecting the specific drive mode best-suited for operating the motor vehicle during normal or adverse road conditions as well as for off-road recreational use.

According to yet another alternative embodiment of the power transfer system, the transfer mechanism is equipped with means for establishing a non-driven or "Neutral" mode whereby no drive torque is transmitted to the driven wheels. In association with this transfer mechanism, the mode select means is adapted to permit the vehicle operator to select the Neutral mode in addition to one or more of the other available part-time and/or on-demand drive modes. Thus, when the power transfer system is operated in any drive mode other than the Neutral mode, a movable shift sleeve is maintained in a first position for mechanically coupling input and output members of the transfer mechanism for delivering drive torque to the driven wheels. However, when the Neutral mode is selected, a representative mode signal is sent to the controller means for controlling actuation of the rotary actuator means so as to cause movement of the shift sleeve from the first position to a second position for disconnecting the input and output members of the transfer mechanism. In the second position, no drive torque is transmitted through the transfer mechanism and thus, no power is supplied to the driven wheels. In a further preferred form of the transfer mechanism, the clutch assembly is returned to its non-actuated condition when the Neutral mode is selected.

A further object of the present invention is to supply one or more "operator-initiated" input signals to the controller means for further controlling "on-demand" operation of the power transfer system in response thereto. Preferably, the operator-initiated input signals are indicative of the position of a movable control element (i.e., accelerator pedal, throttle position, steering wheel, brake pedal, etc.) and are used, in conjunction with the sensor input signals, for optimizing the amount of drive torque delivered to the non-driven wheels during operation in the "on-demand" mode.

BRIEF DESCRIPTION OF THE DRAWINGS

Further objects, features and advantages of the present invention will become apparent from analysis of the following written specification, the accompanying drawings and the appended claims in which:

DETAILED DESCRIPTION OF THE INVENTION

In general, the present invention is directed to a power transfer system which is operably installed between the driven and non-driven wheels of a four-wheel drive vehicle. In operation, the amount of power (i.e., drive torque) transferred to the non-driven wheels is controllably regulated in accordance with various system and driver-initiated inputs for optimizing the tractive characteristics of the vehicle while concomitantly enhancing overall steering control. In addition, the power transfer system may also include means for permitting a vehicle operator to select between a two-wheel drive mode, a part-time four-wheel drive mode, and an "on-demand" drive mode.

Figure 1:
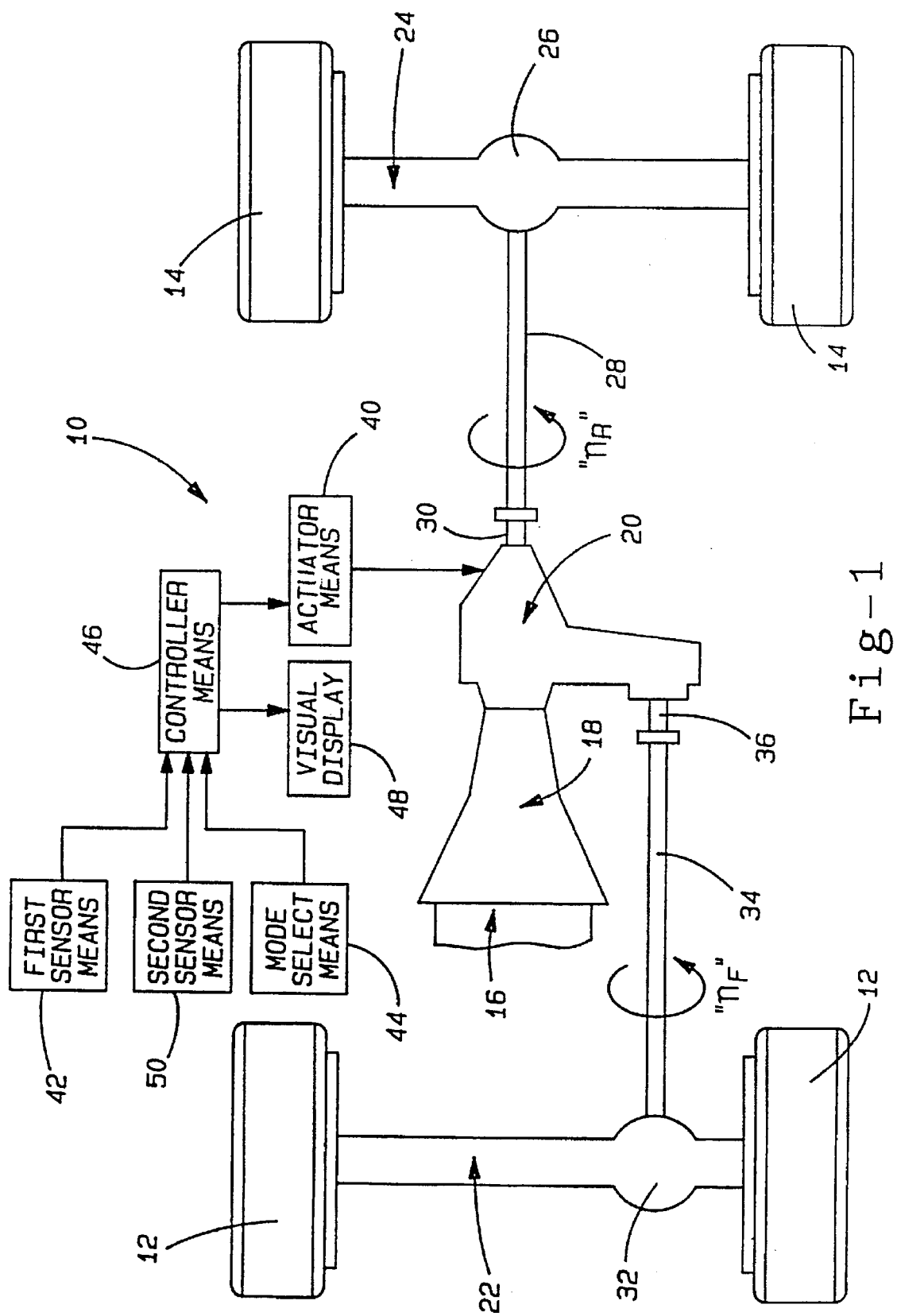
FIG. 1 is a schematic representation of an exemplary four-wheel drive vehicle having the power transfer system of the present invention incorporated therein.

Referring to FIG. 1 of the drawings, a drivetrain for a four-wheel drive vehicle is schematically shown interactively associated with a power transfer system 10 which incorporates the novel principles of the present invention. The motor vehicle drivetrain has a pair of front wheels 12 and rear wheels 14 both drivable from a source of power, such as an engine 16, through a transmission 18 which may be of either the manual or automatic type. In the particular embodiment shown, the drivetrain is a rear wheel drive system which incorporates a transfer case 20 operable to receive drive torque from engine 16 and transmission 18 for normally driving rear wheels 14 (i.e., the "driven" wheels) in a two-wheel drive mode of operation. Front wheels 12 and rear wheels 14 are shown connected at opposite ends of front and rear axle assemblies 22 and 24, respectively. As is known, a rear differential 26 is interconnected between rear axle assembly 24 and one end of a rear drive shaft 28, the opposite end of which is interconnected to a first output member 30 of transfer case 20. Similarly, front axle assembly 22 includes a front differential 32 that is coupled to one end of a front drive shaft 34, the opposite end of which is coupled to a second output member 36 of transfer case 20. It is to be understood that the specific orientation of the drivetrain is merely exemplary in nature and that the drivetrain could be reversed for normally driving front wheels 12.

According to each preferred embodiment of power transfer system 10, transfer case 20 is equipped with an electronically-controlled torque transfer arrangement for delivering drive torque to front wheels 12 (i.e., the non-driven wheels) for establishing a four-wheel drive mode of operation. More specifically, the torque transfer arrangement includes a transfer clutch 38 that is operable for transferring drive torque from first output member 30 to second output member 36, thereby delivering drive torque to front wheels 12. Power transfer system 10 further comprises rotary actuator means 40 for actuating transfer clutch 38, first sensor means 42 for sensing specific dynamic and operational characteristics of the motor vehicle and generating sensor input signals indicative thereof, and controller means 46 for generating a control signal in response to the sensor input signals. Moreover, controller means 46 is adapted to control the amount of drive torque transferred through transfer clutch 38 to second output member 36 by sending the control signal to rotary actuator means 40. As is schematically shown, controller means 46 is also operable for illuminating a visual display 48, located within the passenger compartment, for providing the vehicle operator with a visual indication of the operational status of power transfer system 10. As an additional feature, rotary actuator means 40 may be provided with mode locking means for maintaining power transfer system 10 in the selected drive mode upon the interruption of power.

Power transfer system 10 can include second sensor means 50 for generating "operator-initiated" input signals that are indicative of the position of one or more movable control elements under the control of the vehicle operator. The operator-initiated input signals are used for establishing control characteristics which, in conjunction with the sensor input signals, further regulate the torque distribution during "on-demand" operation. As a further option, power transfer system can be equipped with mode select means 44 for permitting the vehicle operator to select one of a two-wheel drive mode, a part-time four-wheel drive mode and an "on-demand" drive mode. In a system equipped with mode select means 44, rotary actuator means 40 is operable for actuating transfer clutch 38 in response to a mode signal generated by the vehicle operator. When the two-wheel drive mode is selected, all drive torque is delivered from first output member 30 to rear wheels 14 and transfer clutch 38 is maintained in a "non-actuated" condition. When the part-time four-wheel drive mode is selected, transfer clutch 38 is fully actuated and maintained in a "lock-up" condition such that second output member 36 is, in effect, rigidly coupled for driven rotation with first output member 30. As such, the torque distribution between front wheels 12 and rear wheels 14 is dictated by the specific tractive forces generated at each wheel set. When the "on-demand" drive mode is selected, controller means 46 controls the degree of actuation of rotary actuator means 40 for varying the amount of drive torque directed to front wheels 12 through transfer clutch 38 as a function of the sensor input signals for providing enhanced traction when needed. In addition, the ability to controllably modulate the actuated condition of transfer clutch 38 also provides for superior handling and steering control by substantially minimizing the oversteer and understeer tendencies of the vehicle during a cornering maneuver, such tendencies known to be commonly associated with two-wheel drive operation and part-time four-wheel drive operation, respectively. Other advantages associated with controllably modulating the actuated state of transfer clutch 38 will be detailed hereinafter.

Figure 2:
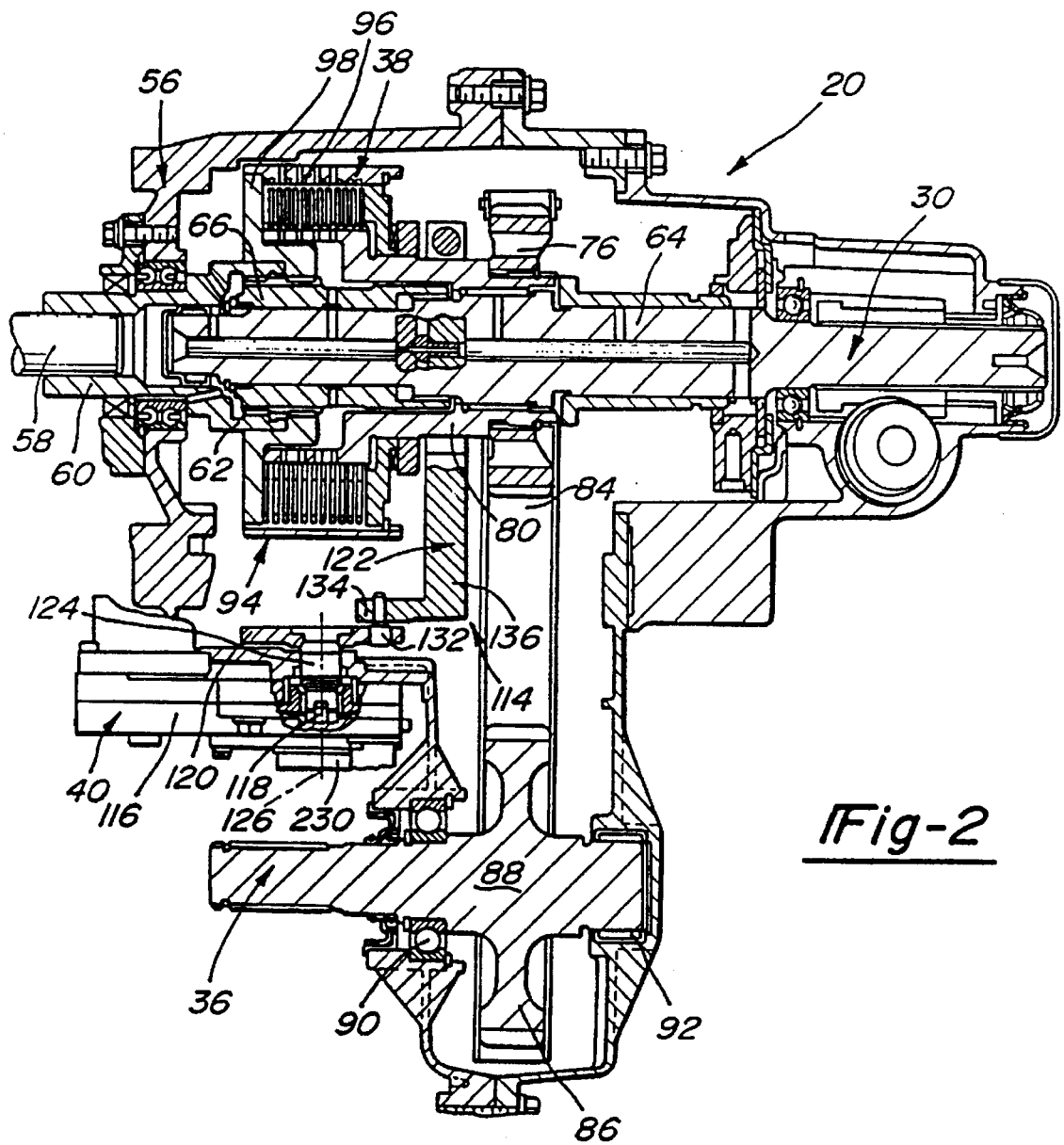
FIG. 2 is a cross-sectional view of a transfer case constructed according to a first embodiment of the power transfer system and which includes a clutch assembly, a drive mechanism, and an electronically-controlled rotary actuator.
Figure 3:
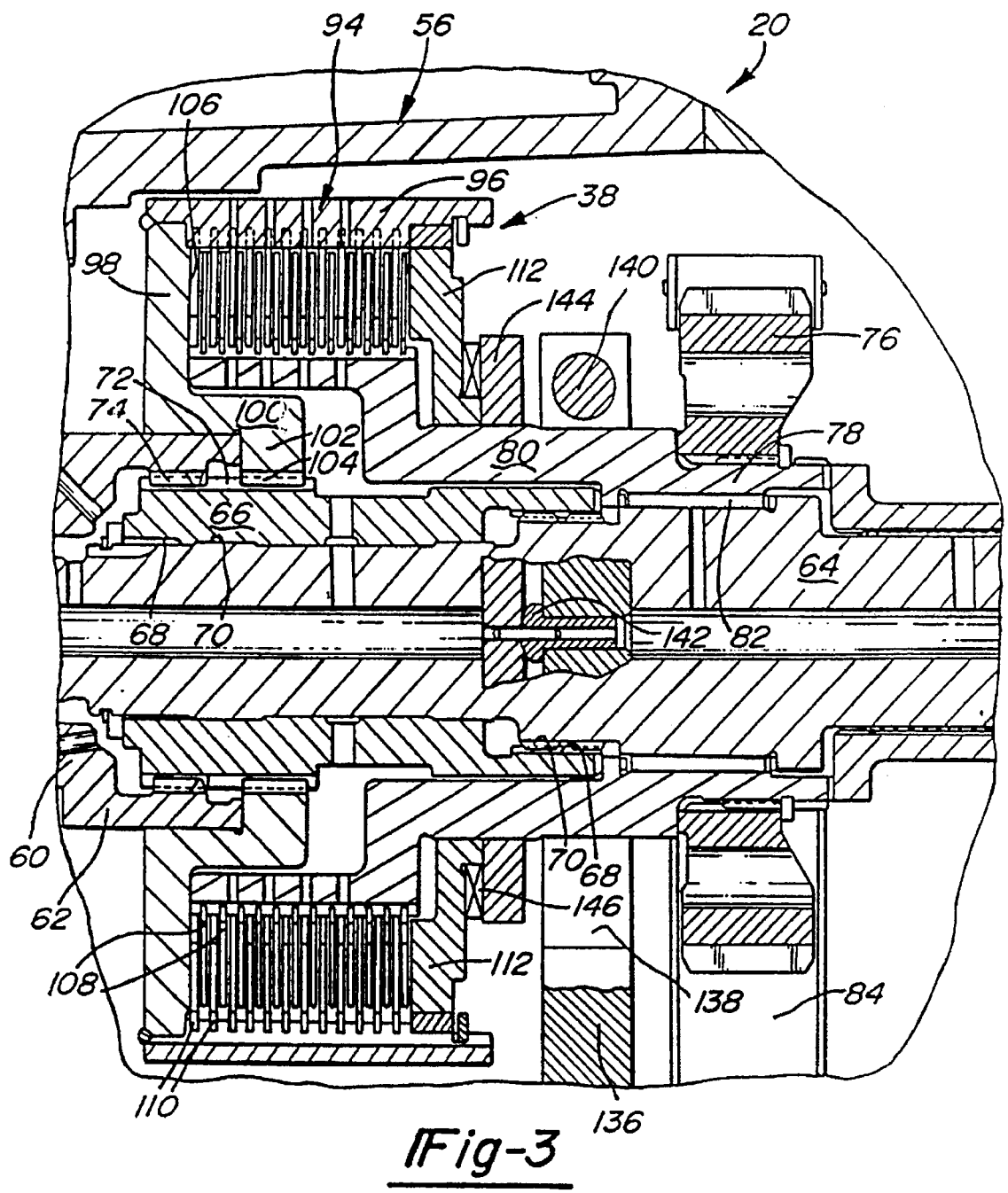
FIG. 3 is an enlarged partial view of FIG. 2 showing the various components in greater detail.

With particular reference to FIGS. 2 and 3, a preferred construction for transfer case 20 will now be described. Transfer case 20 is shown to include a housing 56 formed by a series of modular sections that are suitably interconnected in a conventional manner. A transmission output shaft 58 couples transmission 18 to an input shaft 60 of transfer case 20 for supplying power thereto. Input shaft 60 has an annular input gear 62 formed integral therewith. In the embodiment shown, first output member 30 is an elongated mainshaft 64 which is aligned on the longitudinal axis of input shaft 60 and is supported for rotation within housing 56. An intermediate sleeve 66 is concentrically supported on a forward end portion of mainshaft 64 and is fixed for rotation therewith by means of one or more sets of sleeve internal splines 68 engaged with corresponding sets of external splines 70 formed on mainshaft 64. In addition, intermediate sleeve 66 is formed with external splines 72 that are shown to be engaged with internal splines 74 formed on input gear 62. As such, drive torque is transferred without reduction from input shaft 60 to mainshaft 64 via intermediate sleeve 66. While transfer case 20 is shown to utilize a separate intermediate sleeve 66, it is contemplated that sleeve 66 could be integrated into mainshaft 64 such that mainshaft 64 would be coupled directly to input shaft 60.

With continued reference to FIGS. 2 and 3, means are shown for transferring drive torque from mainshaft 64 to front wheels 12 through transfer clutch 38. More specifically, a drive sprocket 76 is shown fixed (i.e., splined) for rotation on a tubular extension 78 of a rotatable clutch hub 80 that is associated with transfer clutch 38. Extension 78 is shown rotatably supported on mainshaft 64 by one or more suitable bearing assemblies 82. Drive sprocket 76 drivingly engages a chain 84 which is coupled to a lower driven sprocket 86. Driven sprocket 86 is coupled to, or an integral portion of, second output member 36 of transfer case 20. Second output member 36 is shown as a front output shaft 88 which is supported for rotation within housing 56 by suitable bearing assemblies 90 and 92. As noted, front output shaft 88 is operably connected to the motor vehicle's front wheel 12 via front drive shaft 34.

Transfer clutch 38 is shown operably installed within transfer case 20 for selectively transferring drive torque from intermediate sleeve 66 to front output shaft 88. Preferably, transfer clutch 38 is a mechanically-actuated multi-plate clutch assembly that is arranged to concentrically surround a portion of mainshaft 64 and intermediate sleeve 66. As noted, clutch hub 80 is fixedly secured to drive sprocket 76 so as to drive, or be driven by, front output shaft 88 of transfer case 20. In a preferred form, transfer clutch 38 also includes a rotatable drum assembly 94 concentrically surrounding clutch hub 80 and is fixed (i.e., splined) to intermediate shaft 66 for rotation therewith. Drum assembly 94 has an outer cylindrical drum 96 which is enclosed at one end by a cover plate 98. As seen, cover plate 98 has a cup-shaped annular portion 100 surrounding the aft end of input gear 62 and which forms an inward radial flange 102 having internal splines 104 meshed with external splines 72 of intermediate sleeve 66. Accordingly, drum assembly 94 is coupled for rotation with intermediate sleeve 66 and mainshaft 64. Thus, drum assembly 94 and clutch hub 80 are capable of rotating relative to one another and form an internal chamber 106 therebetween. Disposed within internal chamber 106 are two sets of alternately interleaved friction clutch plates that are operable for transferring torque from input shaft 60 through intermediate sleeve 66 and drum assembly 94 to clutch hub 80 and, ultimately, to front output shaft 88 in response to a clutch "engagement" force applied thereto. One set of clutch plates, referred to as inner clutch plates 108, are mounted (i.e., splined) for rotation with clutch hub 80 while the second set of clutch plates, referred to as outer clutch plates 110, are mounted (i.e. splined) to outer drum 96 for rotation with drum assembly 94. In addition, a reaction plate 112 is mounted on the aft end of outer drum 96 for enclosing the interleaved clutch plates within chamber 106. Reaction plate 112 is rotatable with drum assembly 94 and yet is axially movable with respect to interleaved friction clutch plates 108 and 110. Thus, reaction plate 112 acts as a pressure plate for compressing the interleaved clutch plates so as to cause drive torque to be transferred through transfer clutch 38 as a function of the clutch engagement force exerted thereon by rotary actuator means 40. In the embodiment shown, reaction plate 112 is supported for limited axial movement around the outer peripheral surface of an intermediate portion of clutch hub 80.

To provide means for selectively controlling the magnitude of the clutch engagement force exerted on reaction plate 112, rotary actuator means 40 is associated with a mechanical drive mechanism 114 and includes an electrically-controlled rotary actuator 116. Preferably, rotary actuator 116 is an electric gearmotor which is operable for generating an output torque, the value of which varies as a function of the magnitude of the electrical control signal applied thereto by controller means 46. In general, drive mechanism 114 is interconnected to a rotary output member 118 of rotary actuator 116 for changing the output torque into an axially-directed force for controlling the clutch engagement force applied to reaction plate 112 of transfer clutch 38. As best seen from FIGS. 3 and 4, drive mechanism 114 includes a sector plate 120 that is rotatably driven through a limited range of angular motion by output member 118 of rotary actuator 116 and a lever arm assembly 122. Sector plate 120 is interconnected to lever arm assembly 122 which is adapted to exert the clutch engagement force on reaction plate 112 in response to controlled rotation of sector plate 120. A rotatable actuating shaft 124 is supported from transfer case housing 56 for rotation about an axis 126. A first end of actuating shaft 124 is secured in an aperture 128 formed in sector plate 120, with its opposite end coupled to output member 118 of electrically-controlled rotary actuator 116. Thus, actuating shaft 124 and sector plate 120 are rotated about axis 126 in response to rotation of output member 118 upon actuation of rotary actuator 116.

To control the magnitude of the clutch engagement force exerted on reaction plate 112, sector plate 120 includes a contoured mode slot 130 into which a crowned roller 132 extends. Crowned roller 132 is fixed to a flange section 134 of a lever member 136 associated with lever arm assembly 122. Lever member 136 also includes a generally Y-shaped or forked section 138 which is bifurcated to surround mainshaft 64 and clutch hub 80. The bifurcated ends of forked section 138 are retained for pivotal movement on a transverse rail 140, the ends of which are retained in suitable sockets (not shown) formed in housing 56. In general, the contour of mode slot 130 is configured to cause pivotable movement of lever member 136 in response to rotation of sector plate 120 for controlling the clutch engagement force exerted on reaction plate 112 of transfer clutch 38. Moreover, a plurality of circumferentially-spaced buttons 142 are secured to a front surface of forked section 138 and are adapted to apply the clutch engagement force to reaction plate 112 for compressing interleaved clutch plates 108 and 110 via a suitable thrust mechanism. Preferably, the thrust mechanism includes an annular apply plate 144 that is journally supported on clutch hub 80 and positioned intermediate reaction plate 112 and lever member 136, and a thrust bearing/washer arrangement 146 interposed between apply plate 144 and reaction plate 112 for allowing rotation of reaction plate 112 with respect to apply plate 144.

Figure 4:
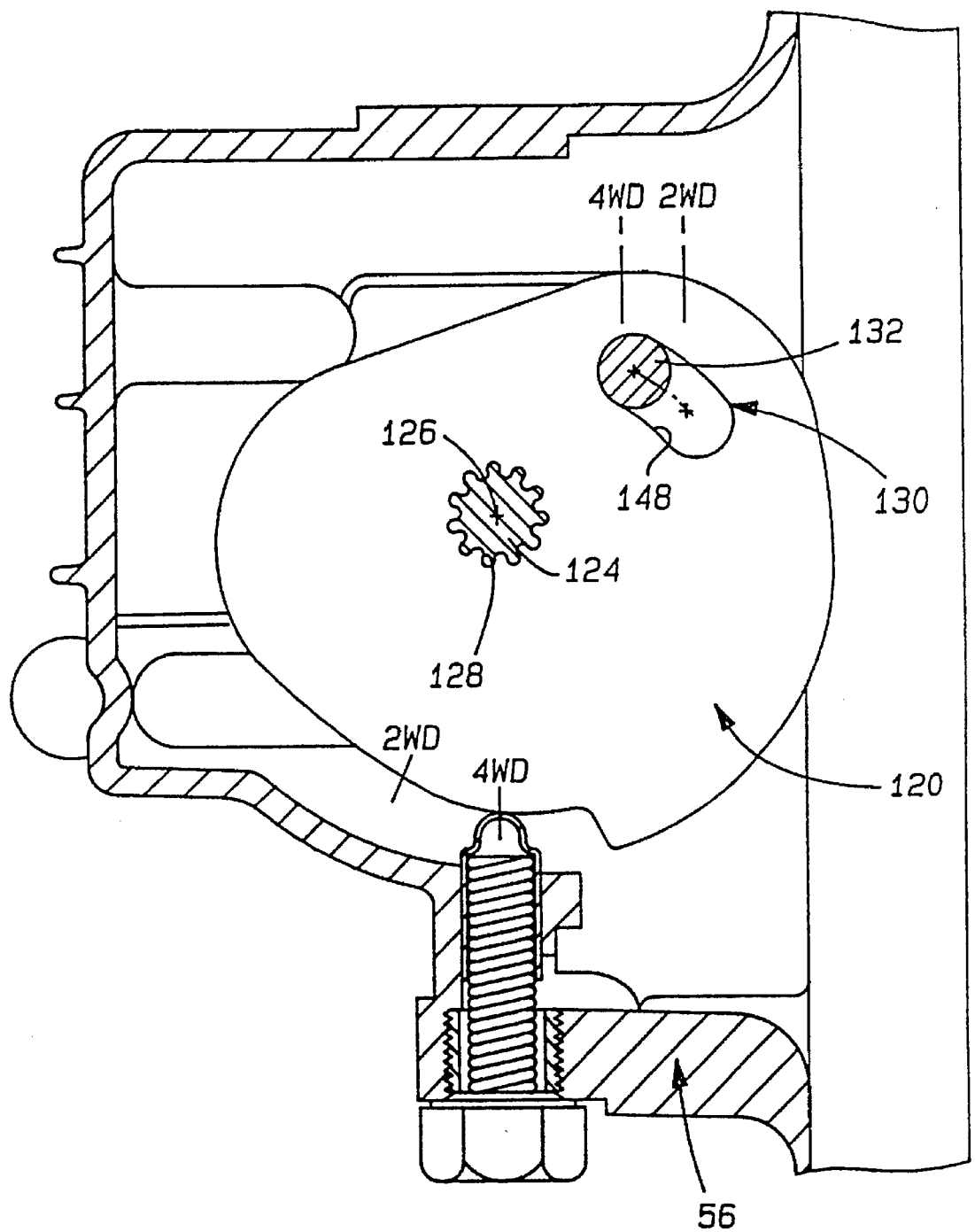
FIG. 4 is a side view of a sector plate associated with the drive mechanism of FIGS. 2 and 3.

With particular reference to FIG. 4, means are provided for coordinating the pivotal movement of lever arm assembly 122 upon rotation of sector plate 120 between the two distinct sector positions, as labelled "4WD" and "2WD". In general, the contour of mode slot 130 is defined by a cam pathway 148. In the 4WD sector position shown, crowned roller 132 is positioned within mode slot 130 in close proximity to the terminal end of cam pathway 148 for establishing a four-wheel drive (4WD) position. With crowned roller 132 in the four-wheel drive (4WD) position, lever arm assembly 122 exerts a maximum clutch engagement force on reaction plate 112 such that transfer clutch 38 is considered to be operating in a fully "actuated" condition. In this fully actuated condition, mainshaft 64 is effectively coupled to front output 88 due to the maximum torque delivered through transfer clutch 38.

As sector plate 120 is caused to rotate about axis 126 in a first direction (i.e., counterclockwise) from the position shown, the contour of cam pathway 148 causes axial displacement of crowned roller 132 toward a two-wheel drive (2WD) position. Such movement of crowned roller 132 causes concurrent pivotable movement of lever arm assembly 122 which results in a proportional decrease in the clutch engagement force that is being exerted on reaction plate 112. Moreover, once crowned roller 132 is in the two-wheel drive (2WD) position, lever arm assembly 122 does not exert an engagement force on reaction plate 112 which is sufficient to transfer drive torque through transfer clutch 38 to clutch hub 80, whereby transfer clutch 38 is considered to be in a "non-actuated" condition. As will be appreciated, rotation of sector plate 120 in the opposite direction (i.e., clockwise) from the 2WD sector position toward the 4WD sector position results in movement of crowned roller 132 toward the four-wheel drive (4WD) position, whereby lever arm assembly 122 is pivoted about rail 140 for proportionally increasing the clutch engagement force exerted on reaction plate 112.

According to the embodiment disclosed, rotary actuator 116 is actuated in accordance with specific predefined relationships that are established in response to the current value of the sensor input signals for rotatably driving sector plate 120 to any position between the 2WD and 4WD sector positions. Thus, the amount of torque transferred "on-demand" through transfer clutch 38 is proportional to the clutch engagement force, the value of which is determined by the particular position of crowned roller 132 between the two-wheel drive (2WD) position and the four-wheel drive (4WD) position that is established upon controlled rotation of sector plate 120.

In its most basic sense, power transfer system 10 automatically and instantaneously transfers drive torque "on-demand" to front wheels 12 during the occurrence of slippage of rear wheel 14 that are typically associated with low tractive road conditions. In addition, power transfer system 10 functions to continuously monitor and regulate the "on-demand" operation in a manner that is independent of any deliberate action by the vehicle operator. Accordingly, the modulation range is established between the limits of bi-directional sector rotation as defined by movement of crowned roller 132 within cam pathway 148 between the (2WD) and (4WD) positions. Moreover, the magnitude of the clutch engagement force generated by lever arm assembly 122 and applied to transfer clutch 38 is proportional to the magnitude of the output torque generated by rotary actuator 116 which, in turn, is proportional to the magnitude of the control signal (i.e., percentage duty cycle) applied by controller means 46 to rotary actuator 116. Thus, the amount of drive torque transferred through transfer clutch 38 to front output shaft 88 is also proportional to the magnitude of the control signal. As such, the distribution ratio of drive torque between front output shaft 88 and mainshaft 64 of transfer case 20 may be selectively varied as a function of changes in the magnitude of the control signal for optimizing the tractive performance characteristics.

Figure 5:
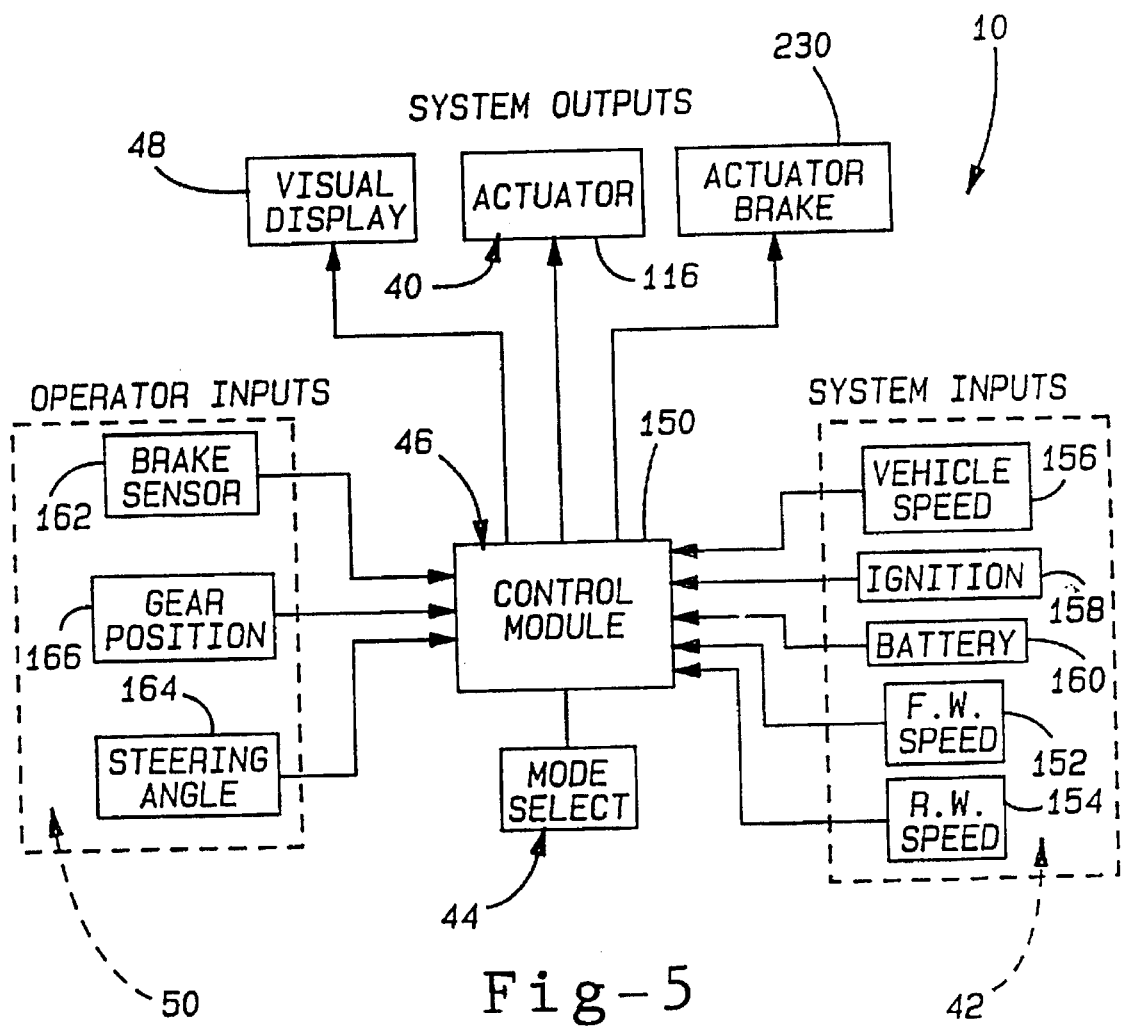
FIG. 5 is a block diagram of the control system for the power transfer system of the present invention.

With particular reference now to FIG. 5, a block diagram of a control system associated with power transfer system 10 is shown. Preferably, controller means 46 is an electronic control module 150 having signal processing and information storage capabilities. In addition, first sensor means 42 is shown as a group of various "system" sensors that are provided for detecting and signaling specific dynamic and operational characteristics of the motor vehicle. The input signals generated by the "systems" sensor group are delivered to electronic control module 150. Preferably, these sensors include a front speed sensor 152 for sensing the rotational speed ($n_F$) of front drive shaft 34, a rear speed sensor 154 for sensing the rotational speed ($n_R$) of rear drive shaft 28, a vehicle speed sensor 156 for sensing a vehicle speed (V), an ignition switch 158 for signalling the operational status of the vehicle, and a battery input 160 for powering electronic control module 150. In vehicles equipped with an anti-lock brake system (ABS), the original equipment ABS sensors provided at each wheel can be used for determining an "average" front drive shaft speed and rear drive shaft speed. Alternatively, front and rear speed sensors 152 and 154, respectively, can be arranged for directly measuring the speed of front output shaft 88 and mainshaft 64, respectively. Moreover, it is possible for vehicle speed sensor 156 to be eliminated with the vehicle speed signal (V) being computed from the front rotational speed signal ($n_F$) generated by front speed sensor 152. However, it is to be understood that any suitable speed sensing arrangement capable of generating a signal indicative of the rotational speed of a shaft is fairly within the scope of the present invention.

The control system also illustrates the use of various "operator-initiated" inputs, as generally categorized by second sensor means 50. These inputs include a brake sensor 162 for sensing when the vehicle operator is applying the brakes, a steering angle sensor 164 for detecting the magnitude of a steering angle ($\Phi$), and an accelerator sensor for sensing an accelerating condition of the vehicle. Preferably, the accelerator sensor is a throttle position sensor 166 for sensing the degree of opening of a throttle valve associated with engine 16 or for sensing the degree of depression of an accelerator pedal, and is operable to produce a throttle position signal (A). The operator-initiated input signals are delivered to control module 150 where they are used, in conjunction with the system input signals, to further control "on-demand" operation.

Figure 6:
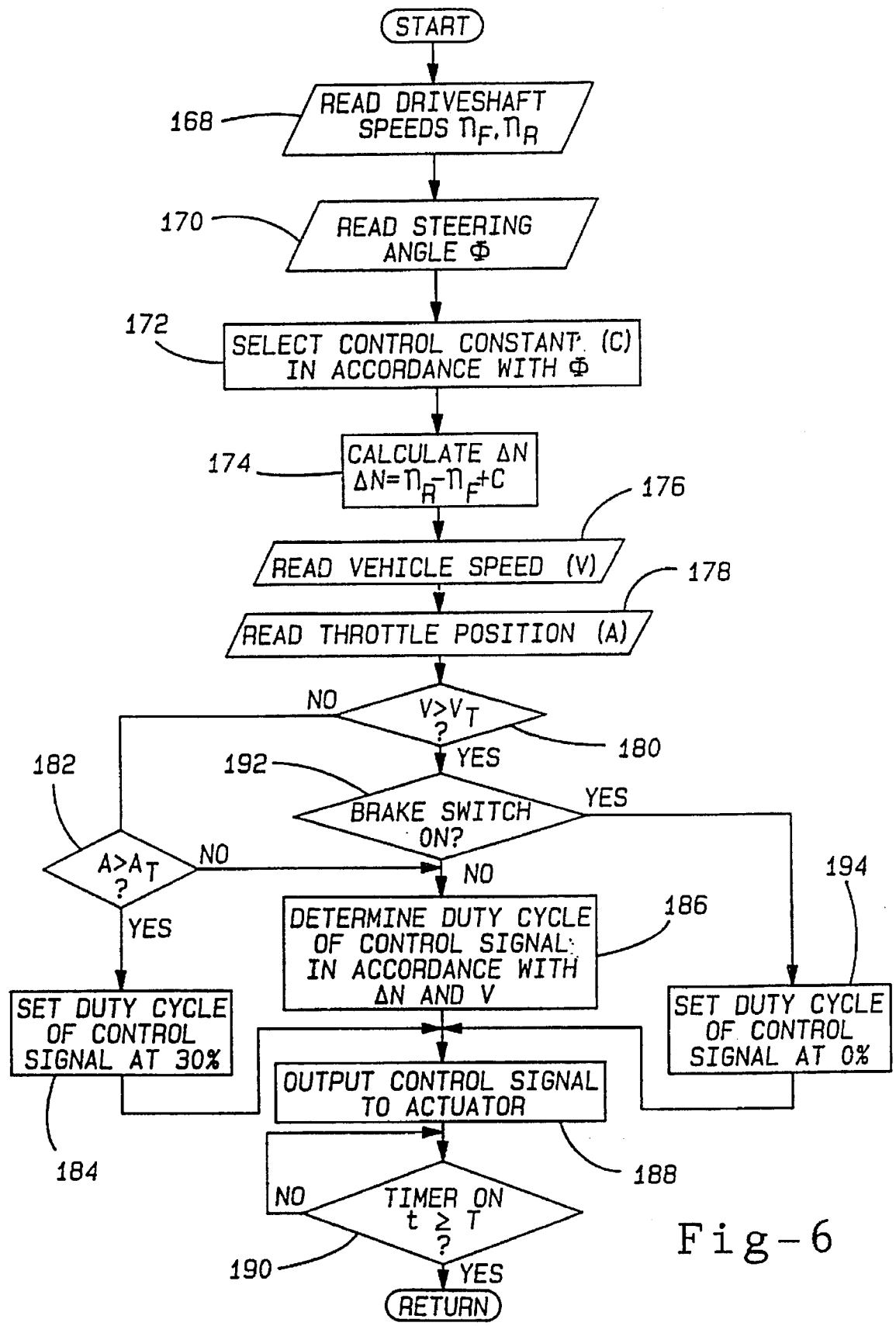
FIGS. 6 is a flow chart depicting a control sequence for the operations performed by the control system of FIG. 5.
Figure 8:
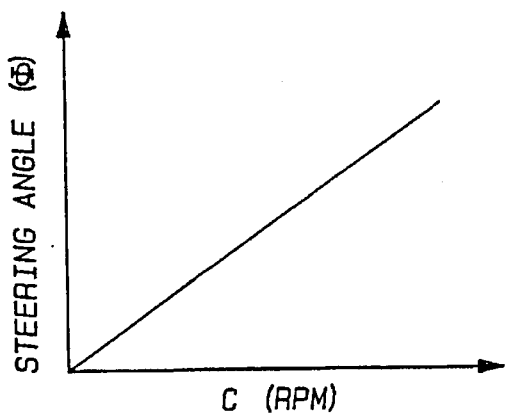
FIG. 8 is an exemplary plot of a relationship between steering angle and a control characteristic used for modifying the speed differential signal.

With reference now to FIG. 6, a control sequence for automatically controlling the "on-demand" operation of power transfer system 10 is shown. In general, the flow chart represents a sequence of the operations performed by electronic control module 150 and which are diagrammatically shown in block form. More specifically, the flow chart illustrates a succession of control steps are continuously repeated for selecting the value of the control signal to be applied to rotary actuator 116 in accordance with various predefined relationships between the current value of a front and rear wheel speed differential ($\Delta N$) and vehicle speed GO, as modified by the steering angle ($\Phi$) and other operator-initiated inputs. Block 168 is representative of the control step in which the current value of the rotational speed of front drive shaft 34 ($n_F$) and rear drive shaft 28 ($n_R$) are read. Block 170 indicates the step of reading the value of steering angle ($\Phi$) as detected by steering angle sensor 164. Block 172 represents the operation of selecting a control characteristic (C) in accordance with the steering angle ($\Phi$). FIG. 8 illustrates a plot of an exemplary relationship, which may be stored as a look-up table or computed from an arithmetic equation in control module 150, which correlates the control characteristic (C) as a linear function of the detected steering angle ($\Phi$). Next, block 174 represents the step of calculating a speed differential ($\Delta N$) according to the equation $$\Delta N = n_R - n_F + C$$

Blocks 176 and 178 indicate the steps of reading the current value of the vehicle speed (V) as detected by vehicle speed sensor 156 and the throttle position (A) as detected by throttle position sensor 166, respectively. As shown in block 180, control module 150 determines whether the vehicle speed (V) exceeds a predefined threshold value ($V_T$) such as, for example, 5 mph. If the vehicle speed is less than the threshold value ($V_T$), a second determination is made (block 182) as to whether the value of the throttle position (A) exceeds a predefined threshold value ($A_T$) such as, for example, a 50% accelerator pedal depression angle. If the vehicle speed (V) is less than its threshold value ($V_T$) and the throttle position (A) exceeds its threshold value ($A_T$), then the magnitude (i.e., percentage of duty cycle) of the electrical control signal is set as a preset value, such as 30% duty cycle, as indicated by block 184. In this manner, power transfer system 10 is adapted to transfer torque to front wheels 12 in response to acceleration at low vehicle speeds to inhibit wheel slip. However, if the value of the throttle position (A) is less than its threshold value ($A_T$), then the magnitude of the duty cycle for the control signal is set in accordance with predefined relationships between the speed differential signal ($\Delta N$) and vehicle speed (V), as indicated by block 186. Block 188 represents the step of outputting the electrical control signal to rotary actuator 116 for developing the desired amount of torque transfer, if any, across transfer clutch 38. As shown in block 190, a timer circuit within control module 150 is actuated simultaneously with energization of actuator 116 for maintaining such energization for a predetermined time period (T). Once the period of energization (t) equals the predetermined time period (T) (or $t \leq T$), control module 150 repeats the control routine.

To enhance steering control, block 192 is indicative of the control step between steps 180 and 186 for determining whether the vehicle operator is applying the brakes when the vehicle speed (V) is greater than the threshold value ($V_T$). Accordingly, if the vehicle operator is attempting to stop the vehicle, by applying the brakes (as sensed by brake sensor 162) during an occurrence of a low traction road condition and the vehicle speed (V) is greater than the predefined threshold ($V_T$), then control module 150 sets the magnitude of the control signal sent to rotary actuator 116 to zero (block 194) for de-actuating transfer clutch 38 and disabling the "on-demand" feature. This control sequence prevents simultaneous braking and "on-demand" four-wheel operation for providing the vehicle operator with greater steering and braking control. However, during the occurrence of a low traction condition when brake sensor 162 signals control module 150 that the vehicle operator is not applying the brakes, electronic control module 150 automatically energizes rotary actuator 116 (block 188) for actuating transfer clutch 38 in accordance with the relationships generally denoted by block 186.

Figure 7:
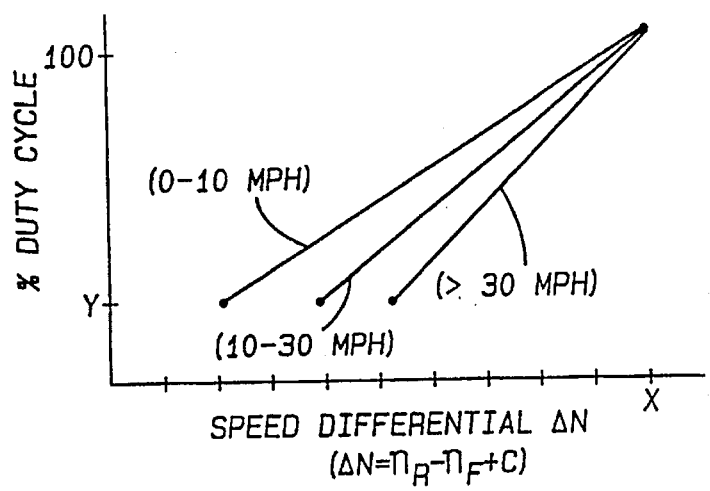
FIG. 7 illustrates exemplary plots of relationships between wheel speed differential signals at various vehicle speed ranges and the electrical control signal supplied by the control system to the rotary actuator for controlling the amount of torque transferred through the clutch assembly.

With particular reference to FIG. 7, a set of exemplary plots used for establishing the magnitude of the duty cycle to be sent to rotary actuator 116 in response to the current value of the speed differential ($\Delta N$) and vehicle speed (V) during "on-demand" operation, as diagrammatically referred to by block 186 in FIG. 6, will now be detailed. As seen, power transfer system 10 linearly correlates the percentage duty cycle of the control signal applied to rotary actuator 116 to a range of speed differential (ΔN) values. In general, the percentage duty cycle for the control signal increases linearly from a minimum actuation value (Y%) to a maximum actuation value (100%) as the value of the speed differential (ΔN), within a particular vehicle speed range, increases from a minimum speed differential limit to a maximum speed differential limit (X). As such, when the value of the speed differential (ΔN) is less than the minimum speed differential limit, no drive torque is transmitted through transfer clutch 38 to front output shaft 88. However, when the value of the speed differential (ΔN) exceeds the minimum differential limit, "on-demand" four-wheel drive operation is established by supplying a control signal to rotary actuator 116 having a duty cycle value greater than (Y%). Thus, the minimum actuation duty cycle (Y%) for the control signal correlates to the point at which frictional engagement between interleaved clutch plates 108 and 110 results in the delivery of a portion of the total drive torque to front output shaft 88 of transfer case 20 for initiating "on-demand" four-wheel drive operation.

Figure 9:
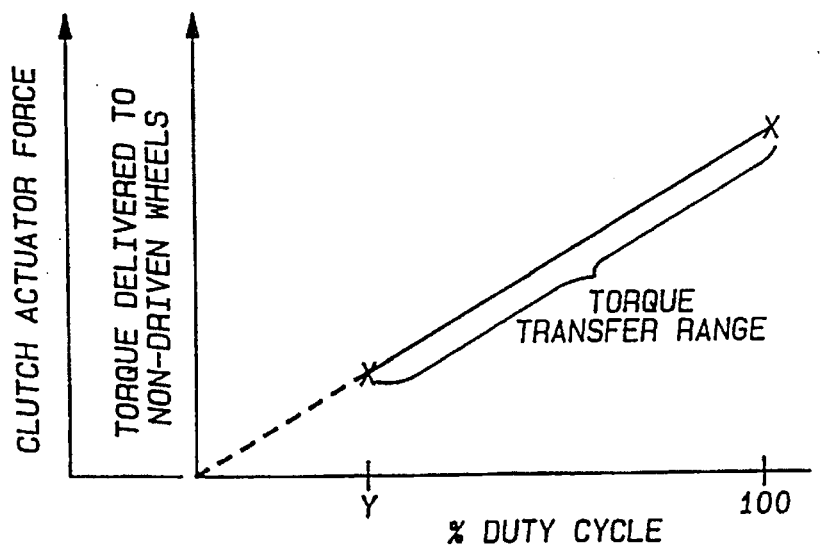
FIG. 9 graphically illustrates the relationship of the electrical control signal with respect to the output force generated by the drive mechanism and the corresponding drive torque transferred through the clutch assembly to the non-driven wheels.

The portion of the total drive torque transferred through transfer clutch 38 to front output shaft 88 increases substantially linearly as the magnitude of the duty cycle for the control signal increases from the minimum actuation value (Y%) to the maximum actuation value (100%). Preferably, the maximum value (X) of the speed differential (ΔN) correlates to the maximum actuation duty cycle (100%) at which point the maximum clutch engagement force is generated for completely locking-up clutch plates 108 and 110. During "on-demand" four-wheel drive operation, a reduction in the magnitude of the control signal sent to rotary actuator 116 will result in actuator output member 118 being back-driven due to the clutch engagement load exerted by lever arm assembly 122 on sector plate 120. As such, a zero control signal will back-drive sector plate 120 until crowned roller 132 is in the two-wheel drive (2WD) position. Alternatively, the direction of driven rotation of actuator output member 118 may be reversed until the desired clutch engagement force is established. As best seen from FIG. 9, an exemplary linear relationship between the magnitude of the duty cycle supplied to rotary actuator 116 and the clutch engagement force generated and, in turn, the amount of torque delivered across transfer clutch 38 is shown.

In accordance with an alternative embodiment of the present invention, power transfer system 10 is also equipped with mode select means 44 for establishing at least three distinct operational modes, namely a two-wheel drive mode, a part-time four-wheel drive mode, and an "on-demand" drive mode. In operation, the vehicle operator selects the desired mode via mode select means 44 which, in turn, signals controller means 46 of the selection. Thereafter, controller means 46 generates an electrical control signal that is applied to rotary actuator 116 for controlling the rotated position of sector plate 120. To provide means for the vehicle operator to shift power transfer system 10 into one of the available operational modes, mode select means 44 can take the form of any mode selector device which is under the control of the vehicle operator for generating a mode signal indicative of the specific mode selected. In one form, the mode selector device may be an array of dash-mounted push button switches. Alternatively, the mode selector device may be a manually-operable shift lever sequentially movable between a plurality positions corresponding to the available operational modes which, in conjunction with a suitable electrical switch arrangement, generates a mode signal indicating the mode selected. In either form, mode select means 44 offers the vehicle operator the option of deliberately choosing between the part-time and on-demand operative drive modes.

Figure 10:
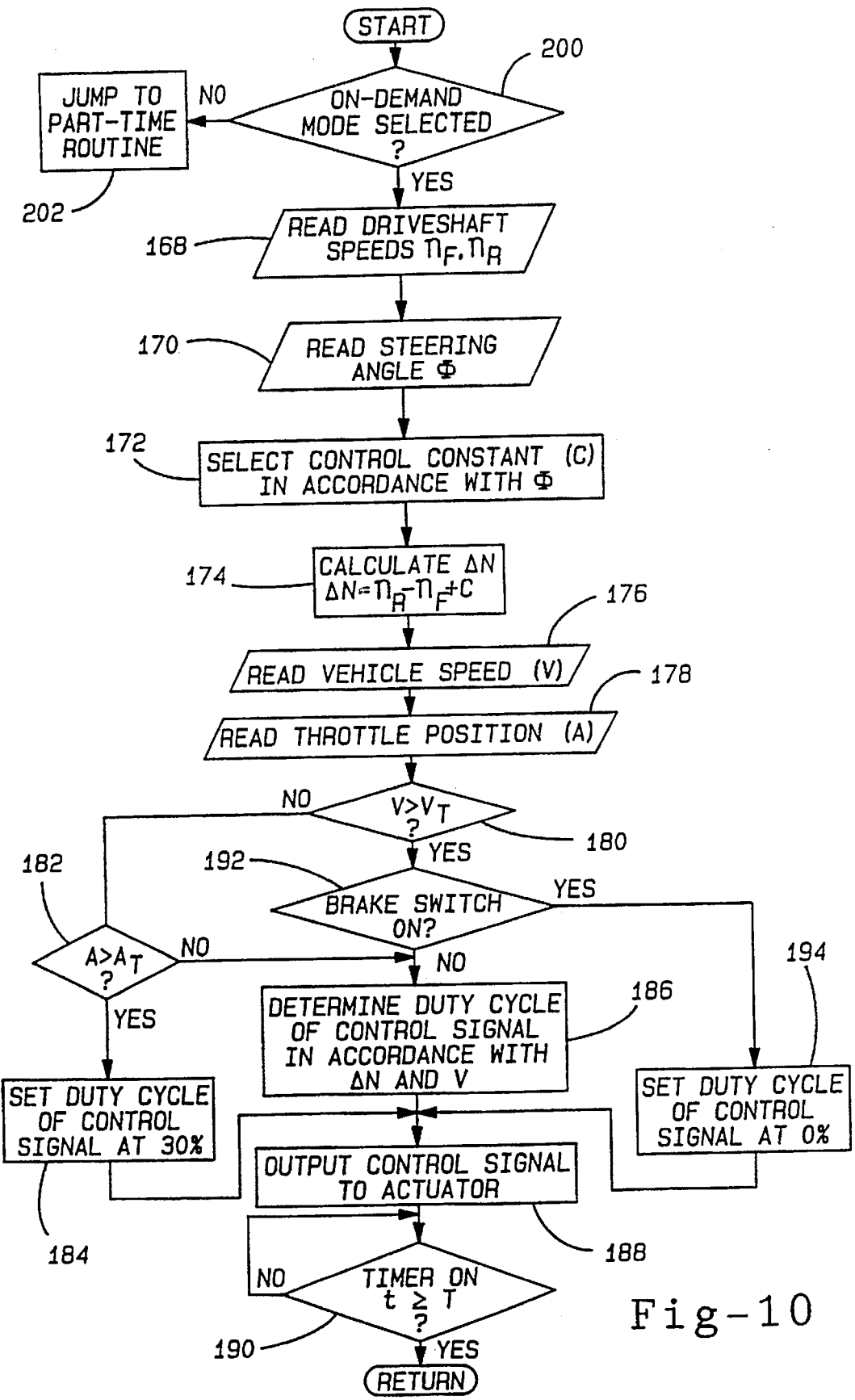
FIG. 10 is a flow chart, similar to the flow chart of FIG. 6, depicting the control sequence for a power transfer system equipped with mode selection capabilities.

With reference now to FIG. 10, a control sequence for the selection and the subsequent automatic control of the "on-demand" drive mode is shown. In general, the flow chart is identical to that shown in FIG. 6 with the addition of control steps for integrating mode select means 44 into the control system. When mode select means 44 signals selection of the "on-demand" mode, as indicated by block 200, a succession of control steps are continuously repeated for selecting the value of the control signal to be applied to rotary actuator 116 in accordance with the above-noted predefined relationships between the current value of a front and rear wheel speed differential (ΔN) and vehicle speed (V), as modified by the steering angle (Φ) and other operator-initiated inputs. However, if any other mode is selected, then the control sequence jumps to a part-time routine, as indicated by block 202. When the vehicle operator selects an operational mode via mode select means 44 other than the "on-demand" drive mode, control module 150 controls the energized condition of rotary actuator 116 for rotating sector plate 120 into one of the 2WD or 4WD sector positions which corresponds to the two-wheel drive mode or part-time four-wheel drive mode, respectively. More particularly, if the two-wheel drive mode is selected, control module 150 sends an electrical control signal to rotary actuator 116 for rotating sector plate 120 in the first direction to the 2WD sector position for causing movement of crowned roller 132 to its two-wheel drive (2WD) position. If the part-time four-wheel drive mode is selected, then rotary actuator 116 is fully actuated to rotate sector plate 120 in the opposite direction to the 4WD sector position for moving crowned roller 132 to its four-wheel drive (4WD) position.

Figure 11:
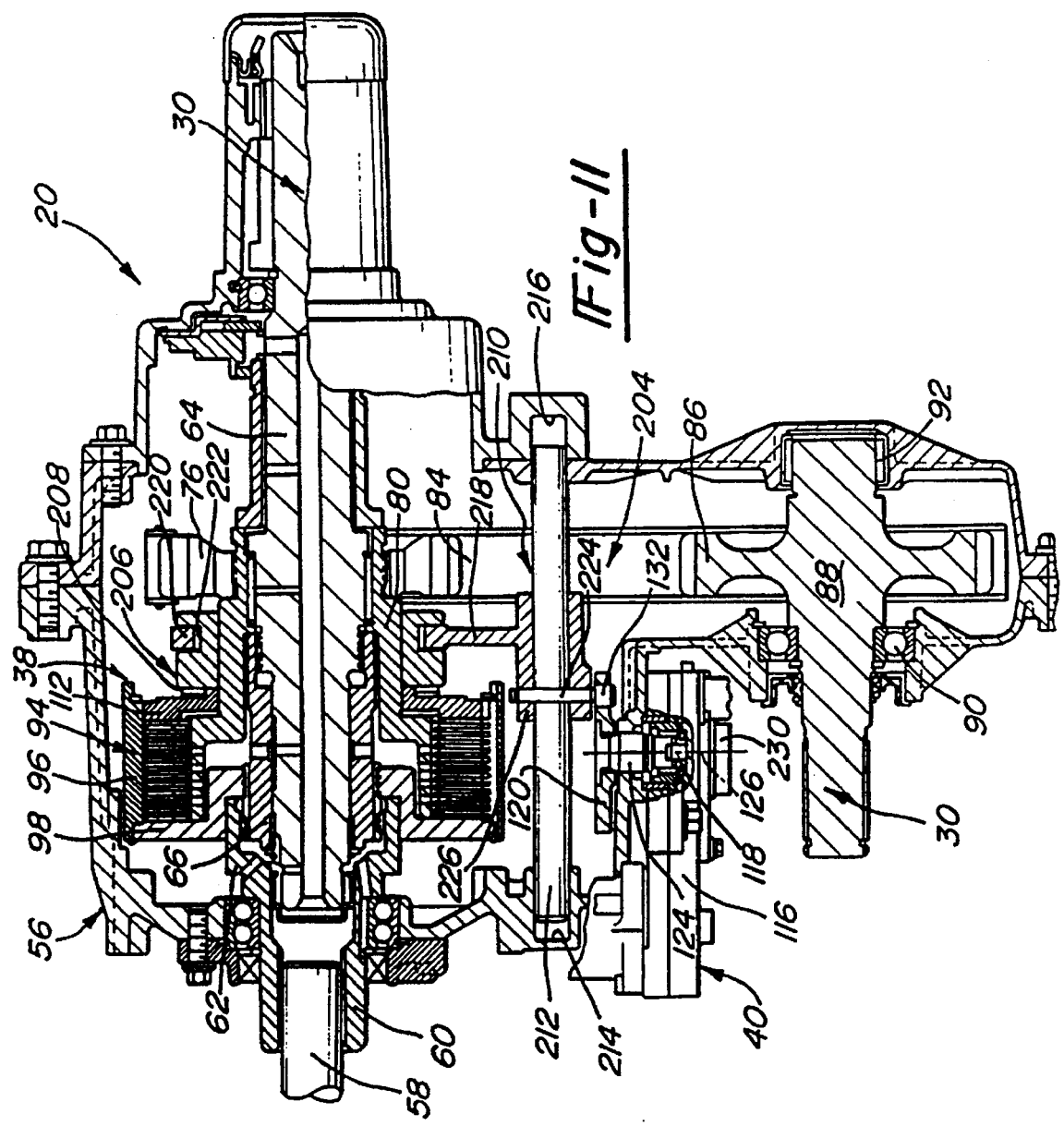
FIG. 11 is a sectional view of a transfer case constructed according to an alternative embodiment and having a modified drive mechanism incorporated therein.

With reference now to FIG. 11, an alternative construction for a drive mechanism 204 is shown which is generally directed to replace lever arm assembly 122 of drive mechanism 114. As such, like numbers are used to identify those components previously described. In general, drive mechanism 204 includes sector plate 120 (FIG. 4) and an axially movable mode sleeve 206 which is journally supported for limited axial sliding movement on clutch hub 80 and positioned intermediate reaction plate 112 and drive sprocket 76. In addition, mode sleeve 206 has a front face surface 208 which is adapted to apply the clutch engagement force to reaction plate 112. A fork assembly 210 couples mode sleeve 206 to sector plate 120 for changing the output torque of rotary output member 118 into an axially-directed force for controlling the clutch engagement force exerted by face surface 208 on reaction plate 112.

Shift fork assembly 210 includes a shift rail 212 retained for sliding movement in sockets 214 and 216 formed in housing 56, and a shift fork 218 fixed to shift rail 212 and having a bifurcated fork portion 220 retained within a annular groove 222 in mode sleeve 206. Crowned roller 132 is fixed, via pin 224 to a tubular portion 226 of shift fork 218 for coupling shift fork 218 for axial sliding movement with rail 212. As before, crowned roller 132 extends into contoured mode slot 130 formed in sector plate 120, wherein the contour of mode slot 130 is configured to cause axial movement of shift fork assembly 210 and mode sleeve 206 in response to rotation of sector plate 120 for controlling the clutch engagement force exerted on reaction plate 112 of transfer clutch 38. In the 4WD sector position, crowned roller 132 is positioned within mode slot 130 in close proximity to the terminal end of cam pathway 148 for again establishing the four-wheel drive (4WD) position. With crowned roller 132 in the four-wheel drive (4WD) position, face surface 208 of mode sleeve 206 exerts a maximum clutch engagement force on reaction plate 112 such that transfer clutch 38 is considered to be operating in a fully actuated condition. As sector plate 120 is caused to rotate about axis 126 in the first direction from the 4WD sector position, the contour of cam pathway 148 causes axial displacement of crowned roller 132 toward the two-wheel drive (2WD) position. Such movement of crowned roller 132 causes concurrent axial movement of fork assembly 210 and mode sleeve 206 which results in a proportional decrease in the clutch engagement force that is being exerted on reaction plate 112. Thus, the amount of torque transferred through transfer clutch 38 is proportional to the clutch engagement force, the value of which is determined by the particular position of crowned roller 132 between the two-wheel drive (2WD) position and the four-wheel drive (4WD) position that is established upon controlled rotation of sector plate 120.

Figure 12:
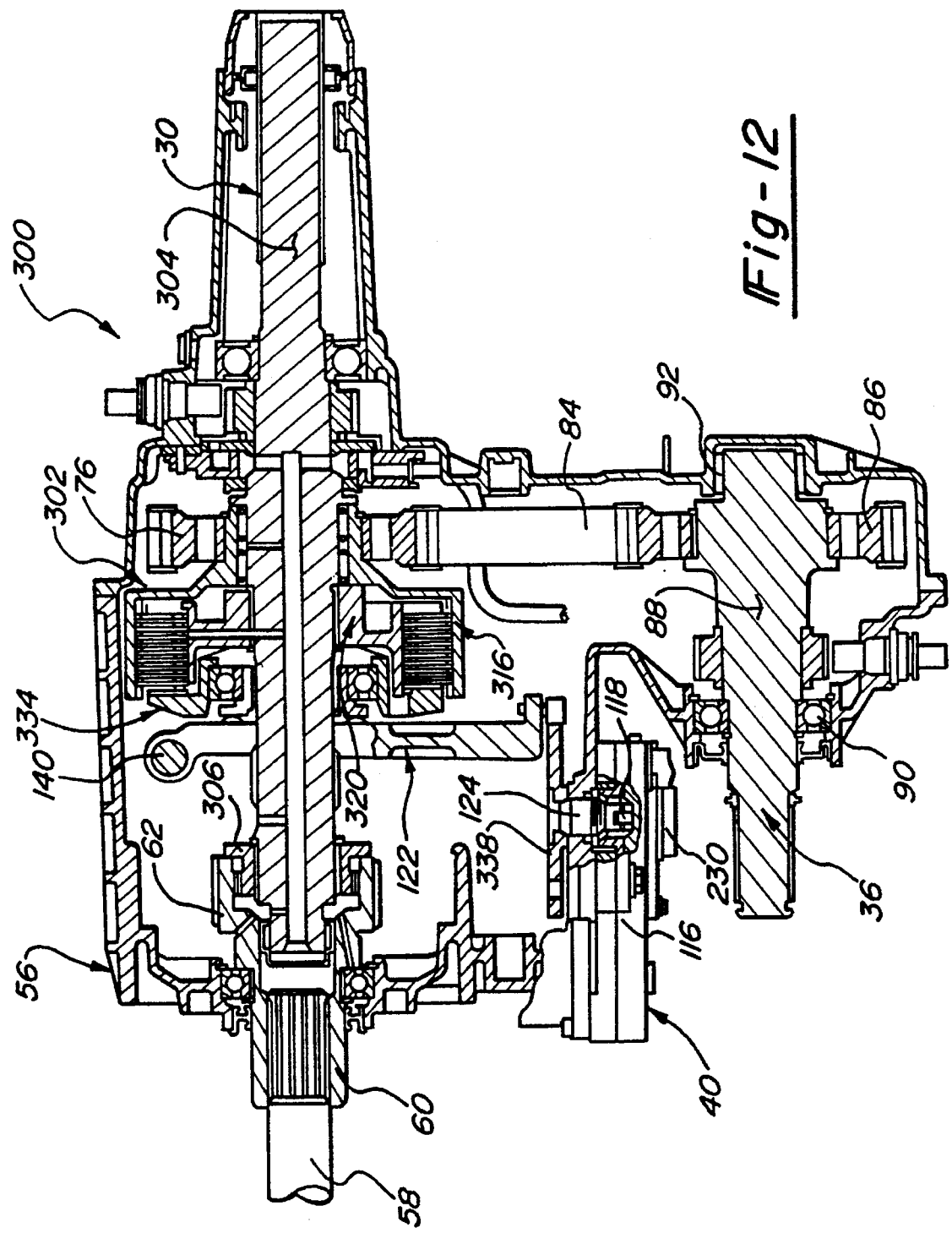
FIG. 12 is a sectional view of a transfer case constructed in accordance with yet another alternative embodiment.
Figure 13:
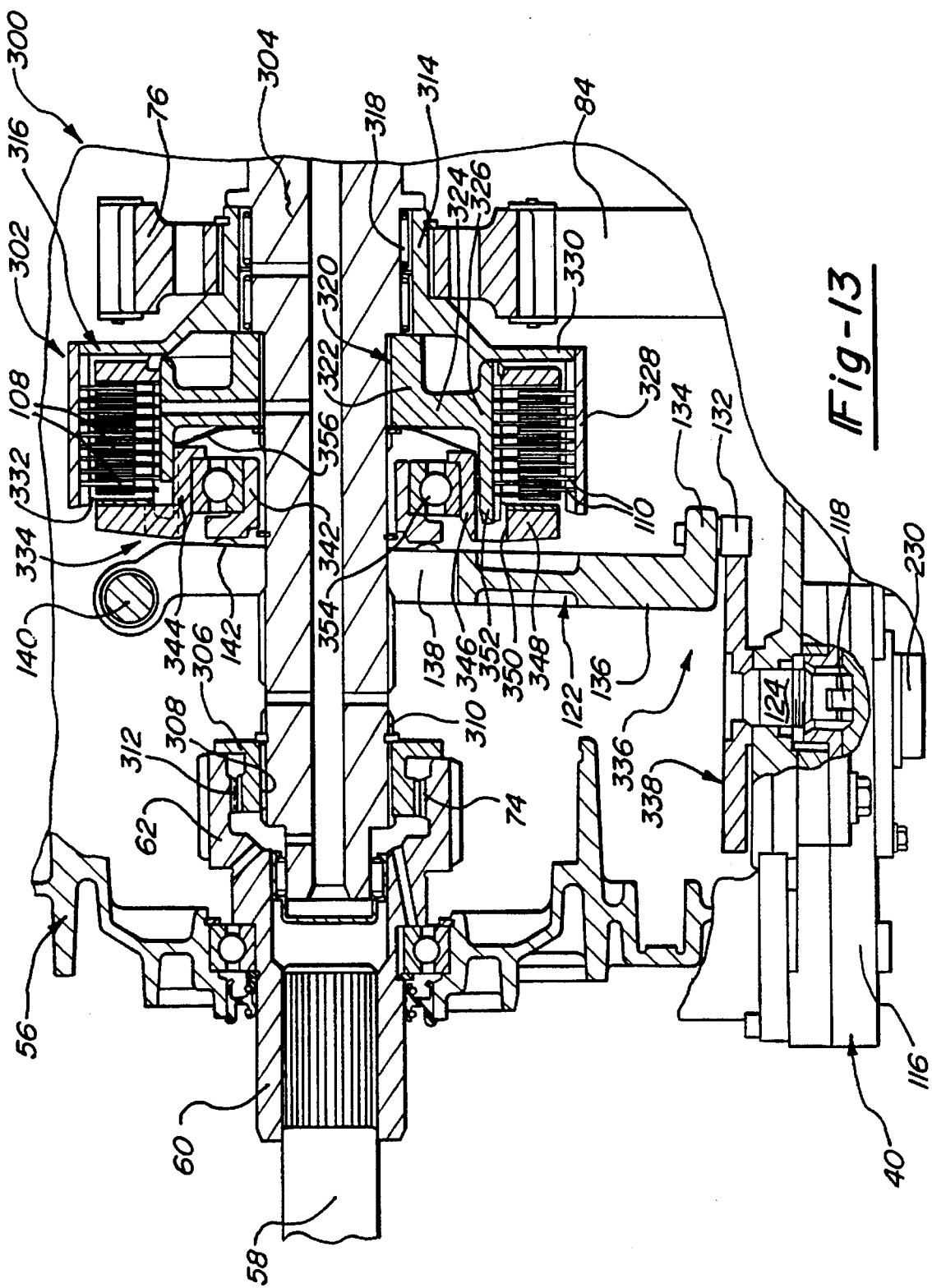
FIG. 13 is an enlarged partial view of FIG. 12 showing the various components in greater detail.
Figure 14:
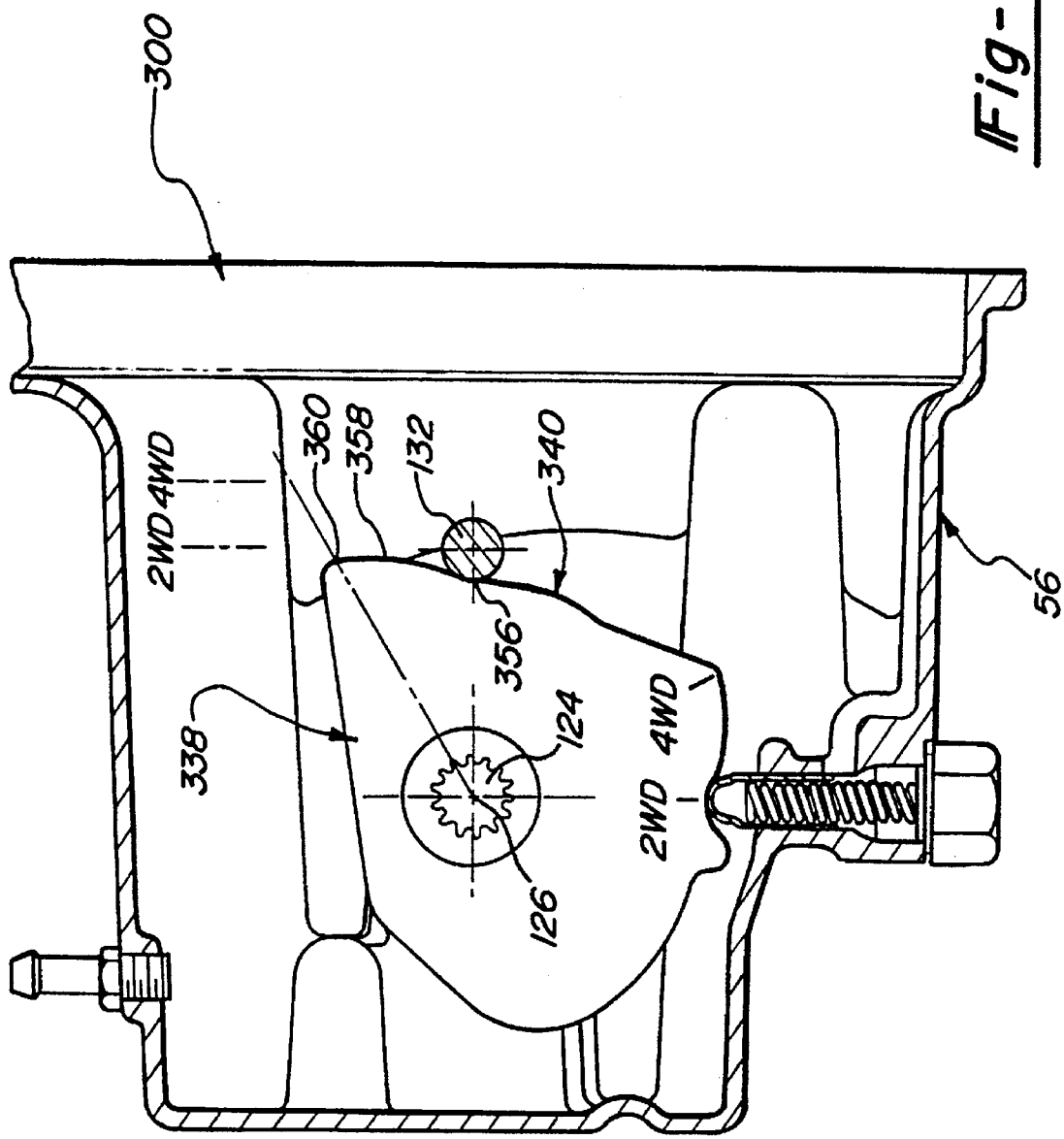
FIG. 14 is a side view of a sector plate associated with the drive mechanism shown in FIGS. 12 and 13.

With particular reference now to FIGS. 12 through 14, another alternative construction is shown for an electronically-controlled torque-modulatable transfer case, hereinafter designated by reference numeral 300. Transfer case 300 can be incorporated into the driveline arrangement shown in FIG. 1 for operation pursuant to the control format and characteristic relationships set forth in FIGS. 5 through 10. Accordingly, since the actuation and control of transfer case 300 is generally similar to that previously disclosed, like numbers are used to designate components thereof that are identical or substantially similar in structure and/or function to those disclosed relative to transfer case 20.

Transfer case 300 is adapted for incorporation into power transfer system 10 and includes an electronically-controlled torque transfer arrangement for transmitting drive torque to front wheels 12 in addition to rear wheels 14 for establishing the part-time and on-demand four-wheel drive modes. The torque transfer arrangement includes a transfer clutch 302 that is operable for transferring drive torque from first output member 30 to second output member 36, thereby delivering drive torque to front wheels 12. In a system equipped with mode select means 44, rotary actuator means 40 is again operable for actuating transfer clutch 302 in response to a mode signal generated by the vehicle operator. When a two-wheel drive mode is available and selected, all drive torque is delivered from first output member 30 to rear wheels 14 and transfer clutch 302 is maintained in a "non-actuated" condition. When a part-time four-wheel drive mode is available and selected, transfer clutch 302 is fully actuated and maintained in a "lock-up" condition such that second output member 36 is, in effect, rigidly coupled for driven rotation with first output member 30. When transfer case 300 is operating in an "on-demand" drive mode, the amount of drive torque directed to front wheels 12 through transfer clutch 302 is automatically modulated as a function of various sensor signals for providing enhanced traction when needed.

With continued reference to FIGS. 12 through 14, the preferred construction for transfer case 300 will now be described with greater specificity. Transfer case 300 is shown to include housing 56 formed by a series of modular sections that are suitably interconnected in a conventional manner. Transmission output shaft 58 couples transmission 18 to input shaft 60 of transfer case 300 for supplying power thereto. Input shaft 60 has annular input gear 62 formed integral therewith. In the embodiment shown, first output member 30 is an elongated mainshaft 304 which is aligned on the longitudinal axis of input shaft 60 and is supported for rotation within housing 56. A sleeve 306 is concentrically supported on a forward end portion of mainshaft 304 and is fixed for rotation therewith by means of internal splines 308 engaged with corresponding sets of external splines 310 formed on mainshaft 304. In addition, sleeve 306 is formed with external clutch teeth 312 that are shown to be meshingly engaged with internal clutch teeth 74 formed on input gear 62. A snap ring is provided for locating and axially retaining sleeve 306 on mainshaft 304 relative to input gear 62. With this arrangement, drive torque is transferred without reduction from input shaft 60 to mainshaft 304.

As best seen from FIGS. 12 and 13, transfer clutch 302 is operably installed within transfer case 300 for selectively transferring drive torque from mainshaft 304 to front output shaft 88. Transfer clutch 302 is a mechanically-actuated multi-plate clutch assembly that is arranged to concentrically surround a portion of mainshaft 304. According to the particular construction shown, transfer clutch 302 includes a drive sprocket 76 that is fixed (i.e., splined) for rotation with an outer drum 316. As seen, outer drum 316 is supported on mainshaft 304 for rotation relative thereto by a suitable bearing assembly 318. Drive sprocket 76 drivingly engages chain 84 which is coupled to lower driven sprocket 86. As previously noted, driven sprocket 86 is coupled to, or an integral portion of, second output member 36 which is shown as front output shaft 88. As also noted, front output shaft 88 is operably connected to the motor vehicle's front wheel 12 via front drive shaft 34. Thus, outer drum 316 is fixedly secured to drive sprocket 76 so as to drive, or be driven by, front output shaft 88 of transfer case 300.

Transfer clutch 302 also includes an inner drum 320 that is fixed (i.e., splined) to mainshaft 304 for rotation therewith. In addition, outer drum 316 is arranged to concentrically surround inner drum 320 so as to form an internal chamber 332 therebetween. Thus, outer drum 31 6 and inner drum 320 are capable of rotating relative to one another. Inner drum 320 is shown as an integral component having an annular hub 322 splined to mainshaft 304, a web 324 extending radially from annular hub 322, and a cylindrical drum 326 formed at the opposite end of web 324 and extending coaxially to hub 322. Outer drum 316 has a cylindrical drum 328 which is enclosed at one end by a cover plate 330. As seen, cover plate 330 includes an integral tubular extension 314 that is supported on bearing assembly 318.

Disposed within internal chamber 332 are two sets of alternately interleaved friction clutch plates that are operable for transferring drive torque from mainshaft 304 and inner drum 320 to outer drum 316 and drive sprocket 76 so as to ultimately deliver drive torque to front output shaft 88 in response to a clutch engagement force applied to the clutch plates. One set of clutch plates, referred to as inner clutch plates 108, are mounted (i.e., splined) to an outer peripheral surface of cylindrical drum 326 for driven rotation with mainshaft 304. The second set of clutch plates, referred to as outer clutch plates 110, are mounted (i.e., splined) to an inner peripheral surface of cylindrical drum 328 for rotation with drive sprocket 76. In addition to inner clutch plates 108, a component of a sliding thrust mechanism 334 is mounted on cylindrical drum 326 of inner drum 320 for rotation therewith and axial movement with respect thereto. As will be described, thrust mechanism 334 is slidably movable on mainshaft 304 and is operable for frictionally compressing the interleaved clutch plates so as to cause drive torque to be transferred through transfer clutch 302 as a function of the clutch engagement force exerted thereon.

To provide means for selectively controlling the magnitude of the clutch engagement force exerted on thrust mechanism 334, rotary actuator means 40 is associated with a mechanical drive mechanism 336 and includes an electrically-controlled rotary actuator 116. As noted, rotary actuator 116 is an electric gearmotor which is operable for generating an output torque, the value of which varies as a function of the magnitude of the electrical control signal applied thereto by controller means 46. Drive mechanism 336 is interconnected to a rotary output member 118 of rotary actuator 116 for changing the output torque into an axially-directed force used for controlling the clutch engagement force applied to thrust mechanism 334 of transfer clutch 302. To this end, drive mechanism 336 includes a pivotable lever arm assembly 122 and a sector plate 338 that is rotatably driven through a limited range of angular motion by output member 118 of rotary actuator 116. More specifically, rotation of sector plate 338 is adapted to cause pivotable movement of lever arm assembly 122 which, in turn, causes sliding movement of thrust mechanism 334 for exerting the clutch engagement force on the interleaved clutch plates.

To generate the desired clutch engagement force, sector plate 338 includes a contoured peripheral edge 340 against which a crowned roller 132 rests. As noted, crowned roller 132 is fixed to a flange section 134 of a pivotable lever member 136 associated with lever arm assembly 122. Lever member 136 includes a forked section 138 which is bifurcated to surround mainshaft 304. The bifurcated ends of forked section 138 are retained for pivotal movement on transverse rail 140, the ends of which are retained in suitable sockets (not shown) formed in housing 56. In general, the contour of sector edge 340 is configured to cause pivotable movement of lever member 136 in response to rotation of sector plate 338 for controlling the clutch engagement force exerted on thrust mechanism 334 of transfer clutch 302.

Thrust mechanism 334 includes an annular inner bearing support 342 journally supported for sliding non-rotatable movement on mainshaft 304. While not shown, inner bearing support 342 includes an axial tang which is nested within a corresponding aperture in lever arm 136 for inhibiting rotation of inner bearing support 342 relative to mainshaft 304 and inner drum 320. Thrust mechanism 334 also includes an annular outer bearing support 344 that is coupled for rotation with inner drum 320. In particular, outer bearing support 344 includes a tubular segment 346 supported for sliding axial movement relative to cylindrical hub 326 and a radial plate segment 348 which acts as a pressure plate for frictionally compressing the interleaved clutch plates. As is also seen, a series of apertures 350 are formed in plate segment 348 of outer bearing support 344. Axial lugs 352 formed on the distal end of cylindrical drum 326 are nested within apertures 350 for coupling outer bearing support 344 for rotation with, and axial movement relative to, inner drum 320. Thus, outer bearing support 344 is supported for rotation with inner drum 320 and mainshaft 304 while inner bearing support 342 is held stationary relative thereto. A thrust bearing assembly 354 is mounted between inner bearing support 342 and outer bearing support 344 for facilitating such relative rotation therebetween while accommodating the thrust forces exerted on thrust mechanism 334. A series of buttons 142 mounted to lever arm 136 act on inner bearing support 342 for causing sliding movement of the entire thrust mechanism 334 in response to pivotable movement of lever arm assembly 122 for causing the clutch engagement force to be exerted by plate segment 348 of outer bearing support 344 on the interleaved clutch plates. Finally, an annular return spring 356 is retained between inner drum 320 and outer bearing support 344 for normally biasing sliding thrust mechanism 334 toward the clutch "non-actuated" condition.

With particular reference to FIG. 14, the means associated with drive mechanism 336 for establishing the range of pivotal movement of lever arm assembly 122 that is generated in response to rotation of sector plate 338 between two distinct sector positions will now be described. As stated, the specific contour of sector edge 340 is adapted to cause axial movement of crowned roller 132 upon rotation of sector 338. In the 2WD sector position shown, crowned roller 132 is positioned against edge 340 in close proximity to a terminal end 356 of an arcuate cam pathway 358 for establishing a two-wheel drive (2WD) roller position. With crowned roller 132 in the two-wheel drive (2WD) position, lever arm assembly 122 exerts a minimal clutch engagement force on thrust mechanism 334 such that transfer clutch 302 is considered to be operating in a "non-actuated" condition. In this non-actuated condition, transfer clutch 302 does not transfer drive torque from mainshaft 304 to front output 88.

As sector plate 338 is caused to rotate about axis 126 in a first direction (i.e., clockwise) from the position shown, the contour of cam pathway 358 causes axial displacement of crowned roller 132 toward a four-wheel drive (4WD) position on cam pathway 358, as indicated at 360. Such movement of crowned roller 132 causes concurrent pivotable movement of lever arm assembly 122 toward transfer clutch 302 which results in a proportional increase in the clutch engagement force that is exerted on clutch plates 108 and 110 by thrust mechanism 334. Moreover, once crowned roller 132 is moved axially to the four-wheel drive (4WD) position, lever arm assembly 122 exerts a maximum clutch engagement force on thrust mechanism 334, whereby transfer clutch 302 is considered to be in its fully "actuated" condition. As will be appreciated, rotation of sector plate 338 in the opposite direction (i.e., counterclockwise) from the 4WD sector position toward the 2WD sector position results in movement of crowned roller 132 toward its two-wheel drive (2WD) position, whereby lever arm assembly 122 is pivoted away from transfer clutch 302 for proportionally decreasing the clutch engagement force exerted on thrust mechanism 334.

During "on-demand" operation, a power transfer system equipped with transfer case 300 functions to continuously monitor and regulate the torque transfer characteristics in a manner that is independent of any deliberate action by the vehicle operator. As noted, the amount of torque transferred through transfer clutch 302 is proportional to the clutch engagement force, the value of which is determined by the particular position of crowned roller 132 on cam pathway 358 between its two-wheel drive (2WD) and four-wheel drive (4WD) positions due to controlled rotation of sector plate 338. Accordingly, the modulation range is established between the limits of bi-directional sector rotation as defined by movement of crowned roller 132 against cam pathway 358 between the (2WD) and (4WD) roller positions. Moreover, since the magnitude of the clutch engagement force generated by lever arm assembly 122 and applied to transfer clutch 302 is proportional to the magnitude of the output torque generated by rotary actuator 116 which, in turn, is proportional to the magnitude of the control signal (i.e., percentage duty cycle) applied by controller means 46 to rotary actuator 116, the amount of drive torque transferred through transfer clutch 302 to front output shaft 88 is also proportional to the magnitude of the control signal. As such, the distribution ratio of drive torque between front output shaft 88 and mainshaft 304 of transfer case 300 may be selectively varied as a function of changes in the magnitude of the control signal for optimizing the tractive performance characteristics. Preferably, control parameters and relationships similar to those set forth in FIGS. 5 through 9 are applicable when transfer case 300 is used in continuous "on-demand" power transfer systems while controls similar to that shown in FIG. 10 are applicable to systems equipped with mode select means 44. More preferably, the "on-demand" control schemes set forth in FIGS. 6 and 10 are slightly modified to eliminate use of an input signal from steering angle sensor 164 (FIG. 5). As such, the control constant (C) is not used in calculating the current value of the speed differential (ΔN) which, in turn, is used for controlling the modulated control of transfer clutch 302. As noted, mode select means 44 can take the form of any mode selector device which is under the control of the vehicle operator for generating a mode signal indicative of the specific mode selected to offer the vehicle operator the option of deliberately choosing between at least one of the part-time drive modes and the on-demand drive mode.

Figure 15:
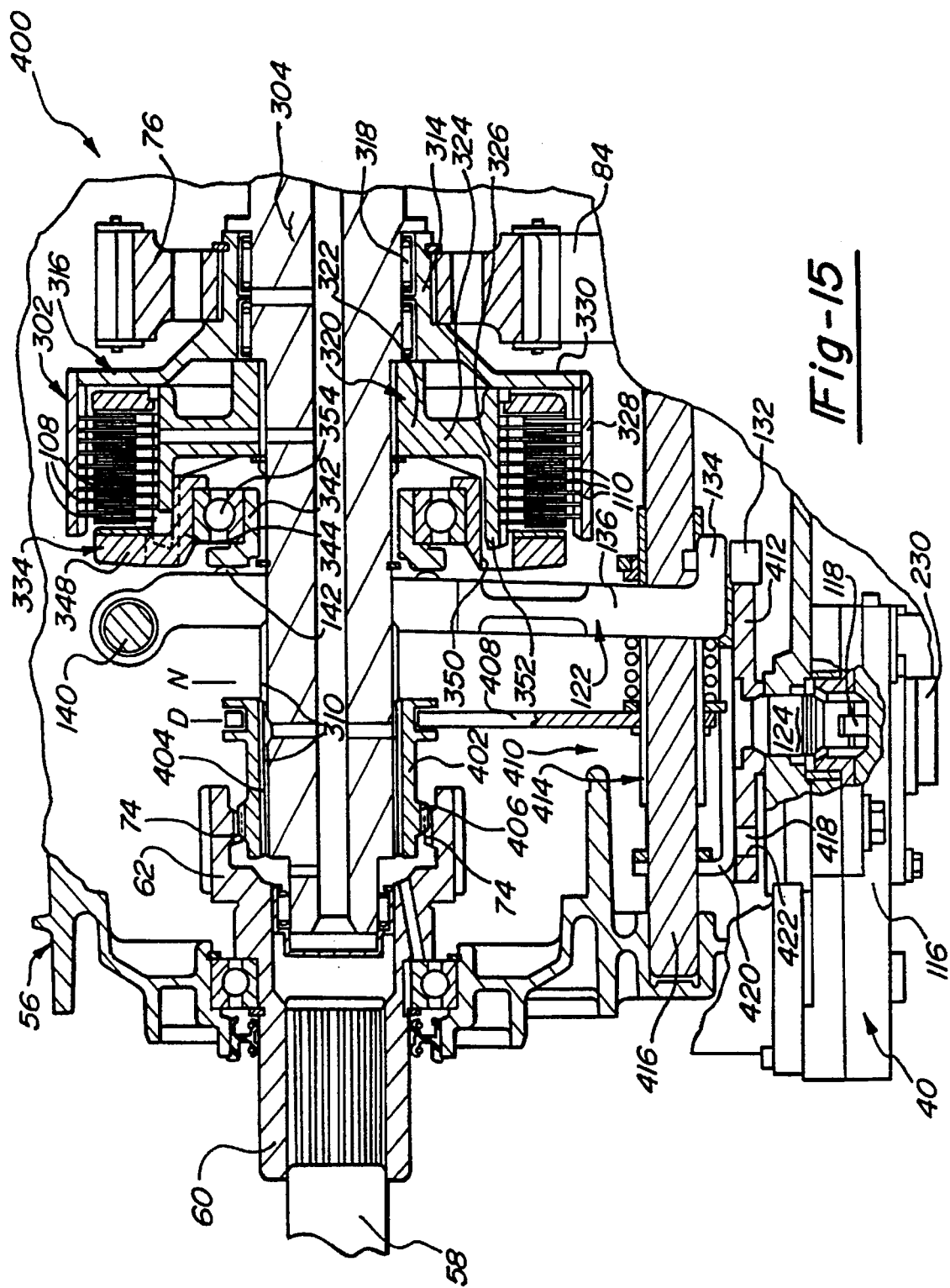
FIG. 15 is a partial sectional view of an alternative construction for the transfer case shown in FIGS. 12 through 14 which incorporates a modified drive mechanism having means for establishing a "Neutral" mode.
Figure 16:
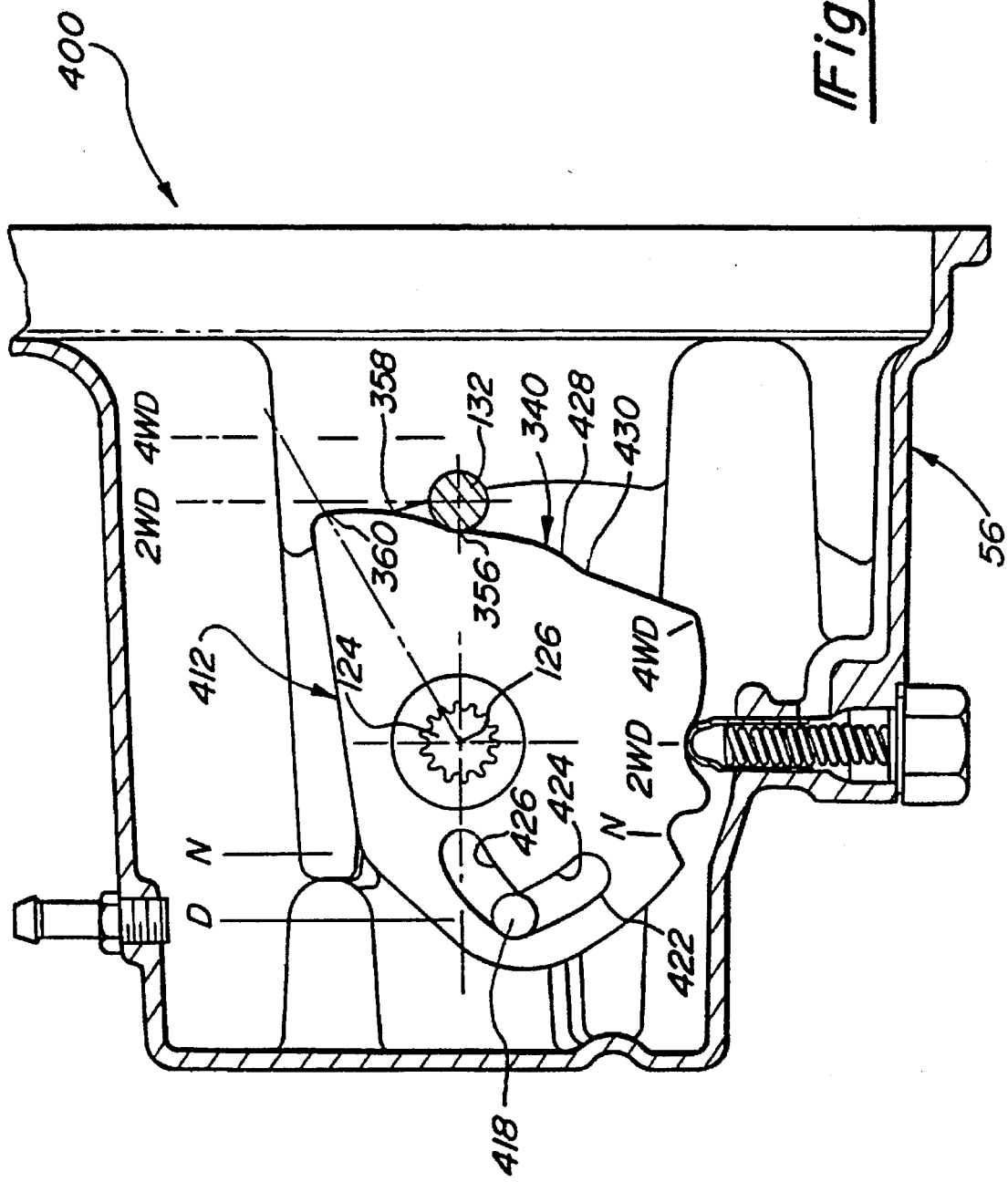
FIG. 16 is a side view of a sector plate associated with the modified drive mechanism shown in FIG. 15.

With reference now to FIGS. 15 and 16, a modified construction of transfer case 300, hereinafter designated by reference numeral 400, is shown. In general, transfer case 400 includes means for permitting the vehicle operator to selectively disconnect mainshaft 304 from input shaft 60 for establishing a non-driven or "Neutral" mode. Thus, transfer case 400 is particularly well-suited for incorporation into power transfer systems equipped with mode select means 44 for establishing the Neutral mode in addition to the "on-demand" drive mode and one or more of the two-wheel drive and part-time four-wheel drive modes. Due to similarity of components, like numbers are used hereinafter to identify those components that are identical to or similar in structure and/or function to those previously described.

To provide means for selectively coupling and de-coupling mainshaft 304 with respect to input shaft 60, a shift sleeve 402 is supported for rotation with and axial sliding movement on mainshaft 304 due to the engagement of internal splines 404 with external splines 310 on mainshaft 304. In addition, shift sleeve 402 is formed with external clutch teeth 406 that are shown meshingly engaged with clutch teeth 74 formed on input gear 62. In this "coupled" position, drive torque is transferred from input shaft 60 through shift sleeve 402 to mainshaft 304 for establishing a drive connection through transfer case 400. Accordingly, construction line "D" identifies the position of shift sleeve 402 when such a "Drive" mode is established. However, when shift sleeve 402 is slid rearwardly to a "de-coupled" position wherein its clutch teeth 406 disengage clutch teeth 74 on input gear 62, then no drive torque is transmitted from input shaft 60 to mainshaft 304 and no power is transmitted through transfer case 400 to the vehicle's rear wheels 14. Accordingly, construction line "N" identifies the position of shift sleeve 402 when a non-driven "Neutral" mode is established. Such a provision for a Neutral mode arrangement is particularly desireable for flat towing (all four wheels on the ground) of the motor vehicle which can be accomplished without requiring disassembly of the front or rear drivelines.

Axial sliding movement of shift sleeve 402 between the two distinct (D) and (N) positions is caused by axial movement of a shift fork 408. As will be described, such movement of shift fork 408 is controlled by actuator means 40 in response to the mode signal delivered to controller means 46 via mode select means 44. In particular, a drive mechanism 410 is used in association with rotary actuator 116 for selectively moving shift sleeve 402 between the (D) and (N) positions while concurrently controlling the magnitude of the clutch engagement force exerted on the interleaved clutch plates. Drive mechanism 410 is generally similar to drive mechanism 336 (FIGS. 12 through 14) with the exception that provisions have been made for selectively controlling movement of shift sleeve 402 in coordination with controlled actuation of transfer clutch 302.

Drive mechanism 410 includes a sector plate 412 that is rotatably driven through a limited range of angular motion by output member 118 of rotary actuator 116 for causing pivotable movement of lever arm assembly 122 which, in turn, controls the magnitude of the clutch engagement force exerted by thrust mechanism 334 on the clutch pack. In addition, sector plate 412 is adapted to concurrently control the axial position of shift fork 408 and, in turn, shift sleeve 402 in response to such controlled rotation of sector plate 412. As best seen from FIG. 15, shift fork 408 is coupled to a spring-loaded shift fork assembly 414 that is supported for sliding movement on a shift rail 416 and which is generally similar to that described in commonly owned U.S. Pat. No. 4,529,080 to Dolan, the disclosure of which is expressly incorporated by reference herein. It can also be seen that a range pin 418 is fixed to a U-shaped bracket 420 of shift fork assembly 414 which, in turn, is retained for sliding movement on shift rail 416. In addition, shift fork 408 is coupled to bracket 420 for movement therewith. While not directed to the novelty of this invention, shift fork assembly 414 includes a spring-biased arrangement adapted to normally bias shift fork 408 and shift sleeve 402 toward the drive (D) position to assist in completing meshed engagement of clutch teeth 406 on sleeve 402 with input gear teeth 74 during a Neutral mode to Drive mode shift.

From FIG. 16, it can be seen that sector plate 412 may be rotated about axis 126 by rotary actuator 116 to any of three distinct sector positions, as labelled "4WD", "2WD" and "N". To control movement of shift sleeve 402, sector plate 412 has an elongated range slot 422 formed therein into which range pin 418 extends. The contour of range slot 422 is configured to cause the desired translational movement of bracket 420, shift fork 408 and shift sleeve 402 in response to controlled bi-directional rotation of sector plate 412. Moreover, in view of incorporation of shift sleeve 402 into transfer case 400, the power transfer system is capable of establishing at least four distinct operative modes, namely a two-wheel drive mode, a part-time four-wheel drive mode, an on-demand drive mode and a Neutral mode. As will be described, the particular mode selected is established by the position of crowned roller 132 against contoured sector edge 340 and the position of range pin 418 within range slot 422, as concurrently established in response to the rotated position of sector plate 412. In operation, the vehicle operator selects the desired operative mode via mode select means 44 which, in turn, signals controller means 46 of the selection. Thereafter, controller means 46 generates an electrical control signal that is applied to actuator 116 for controlling the rotated position of sector plate 412. Moreover, for each of the two-wheel drive, part-time four-wheel drive and Neutral modes, sector plate 412 is controllably rotated to its corresponding 2WD, 4WD and N sector position. However, when the on-demand drive mode is selected, power transfer system 10 is operable for modulating the clutch engagement force applied to transfer clutch 302 as a function of various system and operator initiated inputs in the manner previously disclosed.

With continued reference to FIG. 16, means are shown for coordinating the axial movement of shift fork assembly 414 and the pivotable movement of lever arm assembly 122 upon rotation of sector plate 412 between the various sector positions for establishing the desired combination of drive modes. In general, the contour of range slot 422 is defined by a first guideway 424 and a second guideway 426 which respectively correspond to first and second cam pathways 358 and 428, respectively, that are sequentially formed on contoured edge 340. In the 2WD sector position shown, crowned roller 132 is positioned on first cam pathway 358 at point 356 for establishing a two-wheel drive (2WD) roller position. As previously noted, with crowned roller in its two-wheel drive (2WD) position, lever arm assembly 122 does not exert a sufficient clutch engagement force on thrust mechanism 334 to transfer drive torque through transfer clutch 302, whereby transfer clutch 302 is considered to be in its "non-actuated" condition. Concurrently, range pin 41 8 is shown in position within range slot 422 in close proximity to one end of first guideway 424 for axially locating shift sleeve 402 in the drive (D) position.

As sector plate 412 is caused to rotate about axis 126 in a first (i.e., clockwise) direction from the position shown, the contour of first cam pathway 358 causes axial displacement of crowned roller 132 toward a four-wheel drive (4WD) position. Such axial movement of crown roller 132 causes concurrent pivotable movement of lever arm 136 which results in a proportional increase in the clutch engagement force exerted on thrust mechanism 334. With crowned roller 132 in its four-wheel drive (4WD) position, lever arm assembly 122 exerts a maximum clutch engagement force on thrust mechanism 334 such that transfer clutch 302 is considered to be operating in its fully "actuated" condition. As such, drive torque is transferred from mainshaft 302 to drive sprocket 76 through the interleaved clutch plates 108 and 110 to transmit drive torque to front output shaft 88. Concurrent with such axial movement of crowned roller 132 along first cam pathway 358 toward its four-wheel drive (4WD) position, range pin 418 is guided within first guideway 424 of range slot 422 for maintaining shift sleeve 402 in the drive (D) position. Thus, first guideway 424 is a "dwell" slot having a common radius centered on axis 126 for maintaining shift sleeve 402 in the drive (D) position during axial movement of crowned roller 132 between its (2WD) and (4WD) positions. As discussed, when transfer case 400 is operating in the on-demand mode, actuator 116 is actuated in accordance with specific predefined relationships established in response to the current value of the sensor input signals for rotatably driving sector plate 412 between the 2WD and 4WD sector positions such that the amount of drive torque transferred through transfer clutch 302 is proportional to the clutch engagement force, the value which is determined by the particular position of crowned roller 132 between its (2WD) and (4WD) positions along first cam pathway 358.

According to the embodiment disclosed, power transfer system 10 is further operable to permit transfer case 400 to be shifted into the non-driven or "Neutral" mode. More particularly, upon mode select means 44 signalling selection of the "Neutral" mode, actuator 116 rotates sector plate 412 in the second direction (i.e., counterclockwise) until crowned roller 132 is guided along second cam pathway 428 of contoured edge 340 while range pin 418 is concurrently guided within second guideway 426 of range slot 422. Preferably, the contour of the second cam pathway 428, which begins at point 356 and ends at point 430, is designed to retain crowned roller 132 in the two-wheel drive (2WD) position, whereby transfer clutch 302 is maintained in the non-actuated condition. More preferably, the contour of second cam pathway 428 is an arc having a common radius with its origin located on axis 126. During such rotation of sector plate 412, however, range pin 418 is axially displaced due to the contour of second guideway 426 for axially moving shift sleeve 402 from the drive (D) position to the Neutral (N) position. Thus, during such axial movement of shift sleeve 402, drive mechanism 410 is adapted to maintain transfer clutch 302 in its non-actuated condition to eliminate the possibility of overloading transfer clutch 302. As will be appreciated, when mode select means 44 signals that the vehicle operator wants to shift out of the Neutral mode and into one of the available drive modes, actuator 116 rotates sector plate 412 in the first direction (i.e., clockwise) at least to the 2WD sector position wherein crowned roller 132 engages first cam pathway 358 and range pin 418 is retained within first guideway 424.

In association with power transfer systems utilizing mode select means 44, the present invention also incorporates means for maintaining the selected mode upon power interruption to actuator 116. To this end, a brake 230 is provided that is an electrically-controlled device operable in a "power-off" condition for braking output member 118 of actuator 116. In operation, control module 150 delivers an electrical signal to brake 230 to maintain it in a released or "power-on" condition. During controlled movement of output member 118, brake 230 is maintained in its released "power-on" condition. However, upon interruption of power to brake 230, brake torque is generated for inhibiting linear movement of output member 118. Thus, once output member 118 is positioned in one of its defined positions, power to brake 230 is interrupted for positively retaining sector plate 120 in the desired rotated position. Thereafter, power to rotary actuator 116 can be interrupted to minimize its on-time service requirements.

The foregoing discussion discloses and describes exemplary embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A power transfer system for a motor vehicle having an engine, a first driveline interconnected to a first set of wheels, and a second driveline interconnected to a second set of wheels, said power transfer system comprising:

a transfer case having an input shaft rotatably driven by the engine, a first output shaft interconnected to the first driveline, a second output shaft interconnected to the second driveline, a shift mechanism movable between an engaged position for coupling said first output shaft to said input shaft for establishing a drive mode and a released position for uncoupling said first output shaft from said input shaft for establishing a non-driven mode, a transfer clutch for selectively transmitting drive torque from said first output shaft to said second output shaft, said transfer clutch being operable for varying the drive torque transmitted therethrough in relation to a corresponding variation in a clutch engagement force, a drive mechanism for generating said clutch engagement force and which is movable between a first position whereat a minimum clutch engagement force is generated and a second position whereat a maximum clutch engagement force is generated, a movement coordinating apparatus for coordinating movement of said shift mechanism and said drive mechanism, and an actuator for selectively moving said movement coordinating apparatus between a two-wheel drive position whereat said shift mechanism is in said engaged position and said drive mechanism is in said first position, a four-wheel drive position whereat said shift mechanism is in said engaged position and said drive mechanism is in said second position, and a neutral position whereat said shift mechanism is in said released position and said drive mechanism is in one of said first and second positions;

sensor means for sensing the rotational speed of said first and second output shafts and respectively generating first and second speed signals indicative thereof;

mode select means for enabling a vehicle operator to select one of an On-Demand drive mode and a Neutral mode and generate a mode signal indicative of the particular mode selected; and controller means for receiving said first and second signals and generating a speed differential signal that is indicative of a speed differential between said first and second output shafts, said controller means operable for controlling actuation of said actuator in accordance with said speed differential signal and said mode signal, said controller means causing said actuator to modulate the position of said movement coordinating apparatus between said two-wheel drive and four-wheel drive positions as a function of the magnitude of said speed differential signal for varying the torque transmitted through said transfer clutch when said On-Demand drive mode is selected, said controller means further operable for causing said actuator to move said movement coordinating apparatus to said neutral position when said Neutral mode is selected.

2. The power transfer system of claim 1 wherein said mode select means is operable for enabling a vehicle operator to select a Part-Time Four-Wheel drive mode in addition to said On-Demand drive mode and said Neutral mode, whereby when said mode signals indicates that said Part-Time Four-Wheel drive mode has been selected said controller means causes said actuator to move said movement coordinating apparatus to said four-wheel drive position.

3. The power transfer system of claim 2 wherein said mode select means is further operable to permit selection of a Two-Wheel drive mode, whereby when said mode signal indicates that said Two-Wheel drive mode has been selected said controller means causes said actuator to move said movement coordinating apparatus to said two-wheel drive position.

4. A power transfer system for a motor vehicle having an engine, a first driveline interconnected to a first set of wheels, and a second driveline interconnected to a second set of wheels, said power transfer system comprising:

a transfer case having an input shaft rotatably driven by the engine, a first output shaft interconnected to the first driveline, a second output shaft interconnected to the second driveline, a shift mechanism movable between an engaged position for coupling said first output shaft to said input shaft for establishing a drive mode and a released position for uncoupling said first output shaft from said input shaft for establishing a non-driven mode, a transfer clutch for selectively transmitting drive torque from said first output shaft to said second output shaft, said transfer clutch being operable for varying the drive torque transmitted therethrough in relation to a corresponding variation in a clutch engagement force, a drive mechanism for generating said clutch engagement force and which is operable in a first position for generating a minimum clutch engagement force and in a second position for generating a maximum clutch engagement force, a movement coordinating apparatus for coordinating movement of said shift mechanism and said drive mechanism, and an actuator for selectively moving said movement coordinating apparatus between a two-wheel drive position whereat said shift mechanism is in said engaged position and said drive mechanism is in said first position, a four-wheel drive position whereat said shift mechanism is in said engaged position and said drive mechanism is in said second position, and a neutral position whereat said shift mechanism is in said released position and said drive mechanism is in said first position;

sensor means for sensing the rotational speed of said first and second output shafts and respectively generating first and second speed signals indicative thereof;

mode select means for enabling a vehicle operator to select one of a Part-Time Four-Wheel drive mode, an On-Demand drive mode and a Neutral mode and generating a mode signal indicative of the particular mode selected; and controller means for receiving said first and second speed signals and generating a speed differential signal that is indicative of the speed difference between said first and second output shafts, said controller means operable for controlling actuation of said actuator in accordance with said speed differential signal and said mode signal, and wherein said controller means is operable for causing said actuator to move said movement coordinating apparatus to said four-wheel drive position when said mode signal indicates selection of said Part-time Four-Wheel drive mode, said controller means causing said actuator to modulate the position of said movement coordinating apparatus between said two-wheel drive and four-wheel drive positions as a function of the magnitude of said speed differential signal for varying the torque transmitted through said transfer clutch when said On-Demand drive mode is selected, and said controller means operable for causing said actuator to move said movement coordinating apparatus to said neutral position when said Neutral mode is selected.

5. The power transfer system of claim 4 wherein during operation in said On-Demand drive mode said controller means causes said actuator to move said movement coordinating apparatus to said two-wheel drive position when the value of said speed differential signal is less than a predetermined minimum value and said controller means causes said actuator to move said movement coordinating apparatus to said four-wheel drive position when the value of said speed differential signal exceeds a predetermined maximum value.

6. The power transfer system of claim 4 wherein said mode select means is further operable to permit selection of a Two-Wheel drive mode whereby said controller means causes said actuator to move said movement coordinating apparatus to said two-wheel drive position when said mode signal indicates selection of said Two-Wheel drive mode.

7. A power transfer system for a motor vehicle having an engine, a first driveline interconnecting a first set of wheels and a second driveline interconnecting a second set of wheels, said power transfer system comprising:

a transfer case having an input shaft rotatably driven by the engine, a first output shaft interconnected to the first driveline, a second output shaft interconnected to the second driveline, a shift mechanism movable between an engaged position for coupling said first output shaft to said input shaft for establishing a drive mode and a released position for uncoupling said first output shaft from said input shaft for establishing a non-driven mode, a transfer clutch for selectively transmitting drive torque from said first output shaft to said second output shaft, said transfer clutch being operable for varying the drive torque transmitted therethrough in relation to a corresponding variation in a clutch engagement force, a drive mechanism for generating said clutch engagement force and which is movable between a first position whereat a minimum clutch engagement force is generated and a second position whereat a maximum clutch engagement force is generated, a movement coordinating apparatus for coordinating movement of said shift mechanism and said drive mechanism, and an actuator for selectively moving said movement coordinating apparatus between a two-wheel drive position whereat said shift mechanism is in said engaged position and said drive mechanism is in said first position, a four-wheel drive position whereat said shift mechanism is in said engaged position and said drive mechanism is in said second position, and a neutral position whereat said shift mechanism is in said released position and said drive mechanism is in said first position;

sensor means for sensing the rotational speed of the first and second output shafts and respectively generating first and second speed signals indicative thereof;

mode select means for enabling a vehicle operator to select one of a Two-Wheel drive mode, a Part-Time Four-Wheel drive mode, an On-Demand drive mode and a Neutral mode and generate a mode signal indicative of the particular mode selected; and controller means for receiving said first and second speed signals and generating a speed differential signal that is indicative of a speed difference between said first and second output shafts, said controller means operable for controlling actuation of said actuator in accordance with said speed differential signal and said mode signal, said controller means causing said actuator to move said movement coordinating apparatus to said two-wheel drive position when said mode signal indicates selection of said Two-Wheel drive mode, said controller means causing said actuator to move said movement coordinating apparatus to said four-wheel drive position when said mode signal indicates selection of said Part-Time Four-Wheel drive mode, said controller means causing said actuator to modulate the position of said movement coordinating apparatus between said two-wheel drive and four-wheel drive positions as a function of said speed differential signal for varying the torque transmitted through said transfer clutch when said On-Demand drive mode is selected, and said controller means operable for causing said actuator to move said movement coordinating apparatus to said neutral position when said Neutral mode is selected.

8. The power transfer system of claim 7 wherein during operation in said On-Demand drive mode said controller means causes said actuator to move said movement coordinating apparatus to said two-wheel drive position when the value of said speed differential signal is less than a predetermined minimum value and said controller means causes said actuator to move said movement coordinating apparatus to said four-wheel drive position when the value of said speed differential signal exceeds a predetermined maximum value, and wherein said controller means is operable for increasing the magnitude of drive torque transmitted through said transfer clutch in response to increasing values of said speed differential signal between said predetermined minimum value and said predetermined maximum value.

9. A power transfer system for a motor vehicle having an engine, a first driveline interconnected to a first set of wheels, and a second driveline interconnected to a second set of wheels, said power transfer system comprising:

a transfer case having an input shaft rotatably driven by the engine, a first output shaft interconnected to the first driveline, a second output shaft interconnected to the second driveline, a shift mechanism movable between an engaged position for coupling said first output-shaft to said input shaft for establishing a drive mode and a released position for uncoupling said first output shaft from said input shaft for establishing a non-driven mode, a transfer clutch for selectively transmitting drive torque from said first output shaft to said second output shaft, said transfer clutch being operable for varying the drive torque transmitted therethrough in relation to a corresponding variation in a clutch engagement force, a drive mechanism for generating said clutch engagement force and which is operable in a first position for generating a minimum clutch engagement force and in a second position for generating a maximum clutch engagement force, a movement coordinating apparatus for coordinating movement of said shift mechanism and said drive mechanism, and an actuator for selectively moving said movement coordinating apparatus between a two-wheel drive position whereat said shift mechanism is in said engaged position and said drive mechanism is in said first position, a four-wheel drive position whereat said shift mechanism is in said engaged position and said drive mechanism is in said second position, and a neutral position whereat said shift mechanism is in said released position and said drive mechanism is in said first position;

sensor means for sensing the rotational speed of said first and second output shafts and respectively generating first and second speed signals indicative thereof;

mode select means for enabling a vehicle operator to select one of a Two-Wheel drive mode, an On-Demand drive mode and a Neutral mode and generating a mode signal indicative of the particular mode selected; and controller means for receiving said first and second speed signals and generating a speed differential signal that is indicative of the speed difference between said first and second output shafts controlling actuation of said actuator in accordance with said speed differential signal and said mode signal, and wherein said controller means is operable for causing said actuator to move said movement coordinating apparatus to said two-wheel drive position when said mode signal indicates selection of said Two-Wheel drive mode, said controller means causing said actuator to modulate the position of said movement coordinating apparatus between said two-wheel drive and four-wheel drive positions as a function of the magnitude of said speed differential signal for varying the torque transmitted through said transfer clutch when said On-Demand drive mode is selected, and said controller means operable for causing said actuator to move said movement coordinating apparatus to said neutral position when said Neutral mode is selected.

10. The power transfer system of claim 9 wherein during operation in said On-Demand drive mode said controller means causes said actuator to move said movement coordinating apparatus to said two-wheel drive position when the value of said speed differential signal is less than a predetermined minimum value and said controller means causes said actuator to move said movement coordinating apparatus to said four-wheel drive position when the value of said speed differential signal exceeds a predetermined maximum value.

11. The power transfer system of claim 9 wherein said mode select means is further operable to permit selection of a Part-Time Four-Wheel drive mode whereby said controller means causes said actuator to move said movement coordinating apparatus to said four-wheel drive position when said mode signal indicates selection of said Part-Time Four-Wheel drive mode.

12. A power transfer system for a motor vehicle having an engine, a first driveline interconnected to a first set of wheels, and a second driveline interconnected to a second set of wheels, said power transfer system comprising:

a transfer case having an input shaft rotatably driven by the engine, a first output shaft operably interconnected to the first driveline, a second output shaft operably interconnected to the second driveline, a shift mechanism movable between an engaged position for coupling said first output shaft to said input shaft for establishing a drive mode and a released position for uncoupling said first output shaft from said input shaft for establishing a non-driven mode, a transfer clutch for selectively transmitting drive torque from said first output shaft to said second output shaft, said transfer clutch being operable for varying the drive torque transmitted therethrough in relation to a corresponding variation in a clutch engagement force, a drive mechanism for generating said clutch engagement force, said drive mechanism movable between a first position whereat a minimum clutch engagement force is generated and a second position whereat a maximum clutch engagement force is generated, a movement coordinating apparatus for coordinating movement of said shift mechanism and said drive mechanism, and an actuator for selectively moving said movement coordinating apparatus between a two-wheel drive position whereat said shift mechanism is in said engaged position and said drive mechanism is in said first position, a four-wheel drive position whereat said shift mechanism is in said engaged position and said drive mechanism is in said second position, and a neutral position whereat said shift mechanism is in said released position and said drive mechanism is in said first position;

sensor means for sensing the rotational speed of said first and second output shafts and respectively generating first and second speed signals indicative thereof;

mode select means for enabling a vehicle operator to select one of a Two-Wheel drive mode, a Part-Time Four-Wheel drive mode and a Neutral mode and generate a mode signal indicative of the particular mode selected; and controller means for receiving said first and second speed signals and generating a speed differential signal that is indicative of a speed differential between the first and second set of wheels, said controller means operable for controlling actuation of said actuator in accordance with said speed differential signal and said mode signal, said controller means causing said actuator to move said movement coordinating apparatus to said two-wheel drive position when said mode signal indicates selection of said Two-Wheel drive mode, said controller means causing said actuator to move said movement coordinating apparatus to said four-wheel drive position when said mode signal indicates selection of said Part-Time Four-Wheel drive mode, and said controller means operable for causing said actuator to move said movement coordinating apparatus to said neutral position when said Neutral mode is selected.

13. The power transfer system of claim 12 wherein said drive mechanism includes a lever arm supported for pivotable movement between said first and second position, and wherein said movement coordinating apparatus comprises a rotatable sector plate interconnected to said lever arm such that rotation of said sector plate toward said two-wheel drive position causes corresponding pivotable movement of said lever arm toward said first position and rotation of said sector plate toward said four-wheel drive position causes corresponding pivotable movement of said lever arm toward said second position, and wherein said actuator is an electrically-controlled device having a rotatable output member coupled to said sector plate for controlling rotation thereof in response to an electrical control signal.

14. The power transfer system of claim 13 wherein said shift mechanism includes a shift sleeve retained for rotation with and axial sliding movement on said first output shaft, and a shift assembly interconnecting said shift sleeve to said sector plate, whereby rotation of said sector plate from said neutral position into one of said two-wheel drive and four-wheel drive positions cause corresponding movement of said shift sleeve to said engaged position and rotation of said sector plate to said neutral position causes corresponding movement of said shift sleeve to said released position.

15. A power transfer system for a motor vehicle having an engine, comprising:

a first driveline having a first set of wheels;

a second driveline having a second set of wheels;

a transfer case having an input shaft rotatably driven by the engine, a first output shaft interconnected to said first driveline, a second output shaft interconnected to said second driveline, a shift sleeve movable between an engaged position whereat said first output shaft is coupled to said input shaft for establishing a drive mode and a released position whereat said first output shaft is uncoupled from said input shaft for establishing a non-driven mode, a transfer clutch for selectively transmitting drive torque from said first output shaft to said second output shaft, said transfer clutch being operable for varying the drive torque transmitted therethrough in relation to a corresponding variation in a clutch engagement force, a drive mechanism for generating said clutch engagement force, said drive mechanism movable between a first position whereat a minimum clutch engagement force is generated and a second position whereat a maximum clutch engagement force is generated, means for moving said shift sleeve and said drive mechanism including an actuator selectively movable between a two-wheel drive position whereat said shift mechanism is in said engaged position and said drive mechanism is in said first position, a four-wheel drive position whereat said shift mechanism is in said engaged position and said drive mechanism is in said second position, and a neutral position whereat said shift mechanism is in said released position and said drive mechanism is in one of said first and second positions;

sensor means for sensing the rotational speed of said first and second output shafts and respectively generating first and second speed signals indicative thereof;

mode select means for enabling a vehicle operator to select one of an On-Demand drive mode and a Neutral mode and generate a mode signal indicative of the particular mode selected; and controller means for receiving said first and second speed signals and generating a speed differential signal that is indicative of a speed difference between said first and second output shafts, said controller means operable for controlling actuation of said actuator in accordance with said speed differential signal and said mode signal, said controller means causing said actuator to modulate between said two-wheel drive and four-wheel drive positions as a function of the magnitude of said speed differential signal for varying the torque transmitted through said transfer clutch when said On-Demand drive mode is selected, said controller means further operable for moving said actuator to said neutral position when said Neutral mode is selected.

16. The power transfer system of claim 11 wherein said moving means includes a movement coordinating apparatus for coordinating movement of said shift sleeve and said drive mechanism in response to movement of said actuator.

17. The power transfer system of claim 15 wherein during operation in said On-Demand drive mode said controller means causes said actuator to move to said two-wheel drive position when the value of said speed differential signal is less than a predetermined minimum value and said controller means causes said actuator to move to said four-wheel drive position when said speed differential signal exceeds a predetermined maximum value, and wherein said controller means is operable for increasing the magnitude of drive torque transmitted through said transfer clutch in response to increasing values of said speed differential signal between said predetermined minimum value and said predetermined maximum value.

18. The power transfer system of claim 16 wherein said drive mechanism includes a lever arm supported for pivotable movement between said first and second position, and wherein said movement coordinating apparatus comprises a rotatable sector plate interconnected to said lever arm such that rotation of said sector plate toward said two-wheel drive position causes corresponding pivotable movement of said lever arm toward said first position and rotation of said sector plate toward said four-wheel drive position causes corresponding pivotable movement of said lever arm toward said second position, and wherein said actuator is an electrically-controlled device having a rotatable output member coupled to said sector plate for controlling rotation thereof in response to an electrical control signal the magnitude of which is a function of the magnitude of said speed differential signal.

19. The power transfer system of claim 18 wherein said shift sleeve is retained for rotation with and axial sliding movement on said first output shaft and is operably interconnected to said sector plate, whereby rotation of said sector plate from said neutral position into one of said two-wheel drive and four-wheel drive positions cause corresponding movement of said shift sleeve to said engaged position and rotation of said sector plate to said neutral position causes corresponding movement of said shift sleeve to said released position.

20. A power transfer system for a motor vehicle comprising:

a first driveline having a first set of wheels;

a second driveline having a second set of wheels;

a transfer case having an input shaft rotatably driven by the engine, a first output shaft interconnected to said first driveline, a second output shaft interconnected to said second driveline, a shift sleeve movable between an engaged position whereat said first output shaft is coupled to said input shaft for establishing a drive mode and a released position whereat said first output shaft is uncoupled from said input shaft for establishing a non-driven mode, a transfer clutch for selectively transmitting drive torque from said first output shaft to said second output shaft, said transfer clutch being operable for varying the drive torque transmitted therethrough in relation to a corresponding variation in a clutch engagement force, a drive mechanism for generating said clutch engagement force, said drive mechanism movable between a first position whereat a minimum clutch engagement force is generated and a second position whereat a maximum clutch engagement force is generated, means for moving said shift sleeve and said drive mechanism including an actuator selectively movable between a two-wheel drive position whereat said shift mechanism is in said engaged position and said drive mechanism is in said first position, a four-wheel drive position whereat said shift mechanism is in said engaged position and said drive mechanism is in said second position, and a neutral position whereat said shift mechanism is in said released position and said drive mechanism is in one of said first and second positions;

sensor means for sensing the rotational speed of said first and second output shafts and respectively generating first and second speed signals indicative thereof;

mode select means for enabling a vehicle operator to select one of a Four-Wheel drive mode, an On-Demand drive mode and a Neutral mode and generate a mode signal indicative of the particular mode selected; and controller means for receiving said first and second speed signals and generating a speed differential signal that is indicative of a speed difference between said first and second output shafts, said controller means operable for controlling actuation of said actuator in accordance with said speed differential signal and said mode signal, said controller means causing said actuator to move to said four-wheel drive position when said mode signal indicates selection of said Four-Wheel drive mode, said controller means causing said actuator to modulate between said two-wheel drive and four-wheel drive positions as a function of the magnitude of said speed differential signal for varying the torque transmitted through said transfer clutch when said On-Demand drive mode is selected, said controller means further operable for moving said actuator to said neutral position when said Neutral mode is selected.

21. The power transfer system of claim 20 wherein said moving means includes a movement coordinating apparatus for coordinating movement of said shift sleeve and said drive mechanism in response to movement of said actuator.

* * * * *

UNITED STATES PATENT AND TRADEMARK OFFICE
CERTIFICATE OF CORRECTION

PATENT NO. : 5,655,618
DATED : August 12, 1997
INVENTOR(S) : Robert J. Wilson, David Sperduti, Randy W. Adler, Keith L. Snyder It is certified that error appears in the above-identified patent and that said Letters Patent is hereby corrected as shown below:

Column 9, line 58, "GO" should be --(V)--.

Column 12, line 54, "a" should be --an--. (second occurrence).

Column 13, line 2, after "sleeve" delete --.--.

Column 27, line 15, claim 16, "Claim 11" should be --Claim 15--.

Signed and Sealed this

Second Day of June, 1998

BRUCE LEHMAN

*Attest:*

*Attesting Officer*  Commissioner of Patents and Trademarks